United States Patent
Khatwa et al.

(10) Patent No.: US 7,117,089 B2
(45) Date of Patent: Oct. 3, 2006

(54) GROUND RUNWAY AWARENESS AND ADVISORY SYSTEM

(75) Inventors: Ratan Khatwa, Sammamish, WA (US); Markus A. Johnson, Woodinville, WA (US); Kevin J Conner, Kent, WA (US); John J. Poe, Woodinville, WA (US); James J. Corcoran, III, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/789,368

(22) Filed: Feb. 28, 2004

(65) Prior Publication Data

US 2004/0225440 A1    Nov. 11, 2004

Related U.S. Application Data

(63) Continuation-in-part of application No. 10/440,461, filed on May 15, 2003, and a continuation-in-part of application No. 09/800,175, filed on Mar. 6, 2001, now Pat. No. 6,606,563.

(60) Provisional application No. 60/381,040, filed on May 15, 2002, provisional application No. 60/381,029, filed on May 15, 2002.

(51) Int. Cl.
G06F 163/00    (2006.01)

(52) U.S. Cl. .................. 701/301; 701/96; 701/120; 340/471; 342/29

(58) Field of Classification Search ............... 342/104, 342/109, 34, 29, 933, 961, 456; 717/173, 717/178; 180/170; 701/301, 9, 14, 96, 120; 340/945, 970, 963, 902, 903, 435, 436, 471, 340/479

See application file for complete search history.

(56) References Cited

U.S. PATENT DOCUMENTS 3,925,751 A    12/1975 Bateman et al.
4,646,244 A    2/1987 Bateman et al.
4,914,436 A    4/1990 Bateman et al.
5,343,395 A *  8/1994 Watts ........................... 701/16
5,351,194 A *  9/1994 Ross et al. ............... 455/456.3

(Continued)

FOREIGN PATENT DOCUMENTS

DE    43 04 562 A1    8/1994

(Continued)

Primary Examiner—Deandra M. Hughes
Assistant Examiner—Tuan C To
(74) Attorney, Agent, or Firm—Black Lowe & Graham PLLC

(57) ABSTRACT

A Ground Runway Awareness and Advisory System (GRAAS) that provides supplemental position information and airport situational awareness alerts and advisories to pedestrians and vehicle operators during surface operations by providing timely aural, textual, graphic or pictographic alerts and advisory messages to pedestrians and vehicle operators in a significant number of different scenarios that have led to past runway and taxiway incursion occurrences. These messages are optionally supplemented by a situational awareness video display wherein one or more of the user's position, heading and ground speed are superimposed on a graphic display of airport features of interest. The GRAAS thereby satisfies one clear requirement in reducing VPDs: that the pedestrians or vehicle operators have a clear understanding of the airport layout, including designations of runways and taxiways, and their position relative to the airport layout and features, including aircraft, other ground vehicle traffic and pedestrians where position information is available.

24 Claims, 12 Drawing Sheets

U.S. PATENT DOCUMENTS

| | | |
|---|---|---|
| 5,488,563 A | 1/1996 | Chazelle et al. |
| 5,519,392 A | 5/1996 | Oder et al. |
| 5,519,618 A * | 5/1996 | Kastner et al. ............. 701/120 |
| 5,530,440 A * | 6/1996 | Danzer et al. .............. 340/933 |
| 5,608,392 A | 3/1997 | Faivre et al. |
| 5,629,691 A | 5/1997 | Jain |
| 5,740,047 A | 4/1998 | Pilley et al. |
| 5,839,080 A | 11/1998 | Muller et al. |
| 5,872,526 A | 2/1999 | Tognazzini |
| 6,076,042 A | 6/2000 | Tognazzini |
| 6,182,005 B1 | 1/2001 | Pilley et al. |
| 6,195,609 B1 | 2/2001 | Pilley et al. |
| 6,199,008 B1 | 3/2001 | Aratow et al. |
| 6,216,064 B1 | 4/2001 | Johnson et al. |
| 6,219,618 B1 | 4/2001 | Bateman |
| 6,246,342 B1 * | 6/2001 | Vandevoorde et al. ...... 340/961 |
| 6,282,488 B1 * | 8/2001 | Castor et al. ............... 701/120 |
| 6,304,800 B1 | 10/2001 | Ishihara et al. |
| 6,314,366 B1 * | 11/2001 | Farmakis et al. ........... 701/201 |
| 6,353,794 B1 * | 3/2002 | Davis et al. ................ 701/201 |
| 6,606,563 B1 | 8/2003 | Corcoran, III |
| 6,657,578 B1 | 12/2003 | Stayton et al. |
| 6,694,249 B1 | 2/2004 | Anderson et al. |
| 6,862,519 B1 * | 3/2005 | Walter ........................ 701/120 |
| 2001/0013836 A1 | 8/2001 | Cowie |
| 2002/0089433 A1 | 7/2002 | Bateman et al. |
| 2002/0109612 A1 | 8/2002 | Simon et al. |
| 2002/0116127 A1 | 8/2002 | Sadler |
| 2002/0173888 A1 | 11/2002 | Shelton et al. |
| 2003/0045994 A1 | 3/2003 | Stratton et al. |
| 2003/0107499 A1 | 6/2003 | Lepere et al. |
| 2003/0160708 A1 | 8/2003 | Knoop |
| 2003/0206120 A1* | 11/2003 | Ishihara et al. ............. 340/970 |
| 2004/0030465 A1 | 2/2004 | Conner et al. |

FOREIGN PATENT DOCUMENTS

| | | |
|---|---|---|
| EP | 0 565 399 A1 | 3/1993 |
| EP | 0 674 300 | 9/1995 |
| EP | 0 744 630 A2 | 11/1996 |
| EP | 0 756 153 A2 | 1/1997 |
| JP | 11175900 A | 7/1999 |
| WO | WO 99/09429 | 8/1997 |
| WO | WO 97/47946 | 12/1997 |
| WO | WO 00/16230 | 3/2000 |
| WO | WO 0038131 A | 6/2000 |
| WO | WO 00/57202 | 9/2000 |
| WO | WO 03/107299 | 12/2003 |

* cited by examiner

GROUND RUNWAY AWARENESS AND ADVISORY SYSTEM

This application claims the benefit and is a continuation-in-part of co-pending patent application Ser. No. 10/440,461 entitled, "GROUND OPERATIONS AND IMMINENT LANDING RUNWAY SELECTION," filed in the names of Kevin J Conner, Scott R. Gremmert, Yasuo Ishihara, Ratan Khatwa, John J. Poe and James J. Corcoran III on May 15, 2003, and assigned to the assignee of the present application, the complete disclosure of which is incorporated herein by reference, which claims the benefit of both U.S. Provisional Application Ser. No. 60/381,029, filed in the names of Kevin J Conner, Scott R. Gremmert, Yasuo Ishihara, Ratan Khatwa and John J. Poe on May 15, 2002, the complete disclosure of which is incorporated herein by reference; and U.S. Provisional Application Ser. No. 60/381,040, filed in the name of Kevin J Conner on May 15, 2002, the complete disclosure of which is incorporated herein by reference, and which further claims the benefit of published and is a continuation-in-part of co-pending patent application Ser. No. 09/800,175 entitled, "INCURSION ALERTING SYSTEM," filed in the name of James J. Corcoran III on Mar. 6, 2001, now U.S. Pat. No. 6,606,563 which was issued on Aug. 12, 2003, and assigned to the assignee of the present application, the complete disclosure of which is incorporated herein by reference.

FIELD OF THE INVENTION

The present invention relates to apparatuses, methods and computer program products for facilitating alerting and enhancing situational awareness near airport runways and taxiways, and in particular to apparatuses, methods and computer program products for generating situational awareness advisories and alerts as a function of a position of a ground based vehicles and persons relative to airport runways and taxiways.

BACKGROUND OF THE INVENTION

Runway incursions are currently a well recognized, high-profile safety issue world-wide. Runway incursion prevention has been on the National Transportation Safety Board's (NTSB) list of "most wanted" safety improvements for over a decade. The Federal Aviation Administration (FAA) has also focused much attention into the reduction of runway incursions and has established a dedicated program to address the impending safety issues. Currently the USA is experiencing at least one runway incursion per day at towered airports alone. The FAA divides runway incursions into three broad categories: Operational Errors (OE), Pilot Deviations (PD), and Vehicle/Pedestrian Deviations (VPD). A Vehicle/Pedestrian Deviation (VPD) includes pedestrians, vehicles or other objects interfering with aircraft operations by entering or moving on the runway movement area without authorization from air traffic control. Currently one-fifth of all runway incursions at towered airports in the USA are VPDs. Vehicle or pedestrian conflicts with an aircraft landing or takeoff have resulted in runway incursions. In cases where no conflict with an aircraft is apparent, the vehicle or pedestrian deviation can adversely distract an air traffic controller's attention from aircraft and other vehicles. As with any aviation accident or incident, the causal chain of events leading to VPD runway incursions and inappropriate taxiway transgressions is complex. Cases have been documented wherein vehicles entered runways because the operator was lost and disoriented on the airport surface. Contributory factors have included failure to ask for assistance when doubt existed about vehicle position on the airport surface; not using an airport diagram; and unfamiliarity with the airport. See, for example, "FAA RUNWAY SAFETY REPORT, RUNWAY INCURSION SEVERITY TRENDS AT TOWERED AIRPORTS IN THE UNITED STATES, 1997–2000" published June 2001 by the FAA Office of Runway Safety.

SUMMARY OF THE INVENTION

The present invention provides a Ground Runway Awareness and Advisory System (GRAAS) apparatus, method and computer program product that overcomes limitations of the prior art by providing supplemental position information and airport situational awareness alerts and advisories to pedestrians and vehicle operators during surface operations. The GRAAS invention accordingly provides timely aural, textual, graphic or pictographic alerts and advisory messages to pedestrians and vehicle operators in a significant number of different scenarios that have led to past runway and taxiway incursion occurrences. These alerts and advisory messages are optionally supplemented by a situational awareness video or other display wherein one or more of the user's position, heading and ground speed are superimposed on a graphic display of airport features of interest. The GRAAS of the invention thereby satisfies one clear requirement in reducing VPDs: that the pedestrians or vehicle operators have a clear understanding of the airport layout, including designations of runways and taxiways, and their position relative to thereto.

The GRAAS apparatus, method and computer program product is coupled to a source of state data, by example and without limitation sensor such as GPS receiver latitude and longitude data, and to a computer-searchable database of airport features of interest, including runways and taxiways and other significant features.

According to one aspect of the invention, the GRAAS is provided as a method embodied in a computer program product as a computer-usable medium having computer-readable code embodied therein for configuring a computer, the computer program product including: computer-readable code configured to cause a computer to periodically receive one or more state parameters of interest; computer-readable code configured to cause a computer to periodically access a searchable database of stored data describing airport features of interest and to retrieve therefrom one or more of the stored data; computer-readable code configured to cause a computer to construct a zone of awareness relative to one or more of the retrieved airport features of interest; computer-readable code configured to cause a computer to periodically compare the state parameters with one or more of the zones of awareness; computer-readable code configured to cause a computer to periodically detect one or more alert conditions as a function of comparing the state parameters with one or more of the zones of awareness; computer-readable code configured to cause a computer to generate an alert as a function of at least one of the detected alert conditions; and computer-readable code configured to cause a computer to output an annunciation representative of the alert.

According to another aspect of the invention, the computer-readable code configured to cause a computer to periodically access a searchable database of stored data describing airport features of interest and to retrieve therefrom one or more of the stored data further includes computer-readable code configured to cause a computer to access the searchable database as a function of the state parameters.

According to another aspect of the invention, the computer-readable code configured to cause a computer to periodically receive one or more state parameters of interest further includes computer-readable code configured to cause a computer to periodically sample a source of sensor data.

According to another aspect of the invention, the computer-readable code configured to cause a computer to periodically sample the sensor data and to periodically receive one or more state parameters of interest further includes computer-readable code configured to cause a computer to generate from the sampled sensor data one or more state parameters of interest including one or more of ground speed, heading and position.

According to another aspect of the invention, the computer-readable code configured to cause a computer to generate one or more state parameters of interest further includes one or more of: computer-readable code configured to cause a computer to extract the state parameters of interest from the sampled sensor data, and computer-readable code configured to cause a computer to derive the state parameters of interest from the sampled sensor data.

According to another aspect of the invention, the computer-readable code configured to cause a computer to output an annunciation representative of the alert further includes computer-readable code configured to cause a computer to output the annunciation representative of the alert as a function of a potential of the detected alert conditions for causing a runway incursion, taxiway transgression or other unsafe state relevant to the user's tasks.

According to another aspect of the invention, the computer-readable code configured to cause a computer to construct a zone of awareness relative to one or more of the retrieved airport features of interest is limited to computer-readable code configured to cause a computer to construct a zone of awareness relative to one or more of the taxiways and runways. According to another aspect of the invention, the computer-readable code configured to cause a computer to periodically detect one or more alert conditions as a function of comparing the state parameters with one or more of the zones of awareness constructed relative to one or more of the taxiways and runways further includes computer-readable code configured to cause a computer to determine the alert conditions as a function of the comparing the state parameters with one or more of the zones of awareness resulting in an indication of one or more of an approaching taxiway condition, an on taxiway condition, an excessive ground speed condition, an approaching runway condition, an on runway condition, a runway distance remaining condition, and an approaching end of runway condition.

According to other aspects of the invention, the GRAAS is embodied as an apparatus having either a dedicated or general purpose processor with the computer program product installed thereon.

According to still another aspect of the invention, the GRAAS apparatus includes the computer-searchable database of stored data describing the one or more airport features of interest.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF PREFERRED EMBODIMENT

In the Figures, like numerals indicate like elements.

The present invention is described more fully hereinafter with reference to the accompanying drawings, in which preferred embodiments of the invention are shown. This invention is, however, embodied in many different equivalent forms and is not be construed as limited to the embodiments set forth herein; rather, these embodiments are provided so that this disclosure will be thorough and complete, and will fully convey the scope of the invention to those skilled in the art. Like numbers refer to like elements throughout.

James J. Corcoran III independently invented the alerting system described in published patent application "INCURSION ALERTING SYSTEM," which is incorporated herein by reference, for alerting an occupant of a vehicle that the vehicle is in or is approaching a "zone of awareness." The Corcoran alerting system includes: a storage device located on the vehicle with the storage device being configured to store location information for a plurality of zones of awareness; a positioning system located on the vehicle with the positioning system being configured to determine the vehicle location; an alerting device located on the vehicle with the alerting device being configured to alert the occupant; and a processor located on the vehicle with the processor being configured to provide controlling input to the alerting device based on the vehicle location and the stored location information.

Figure 1:
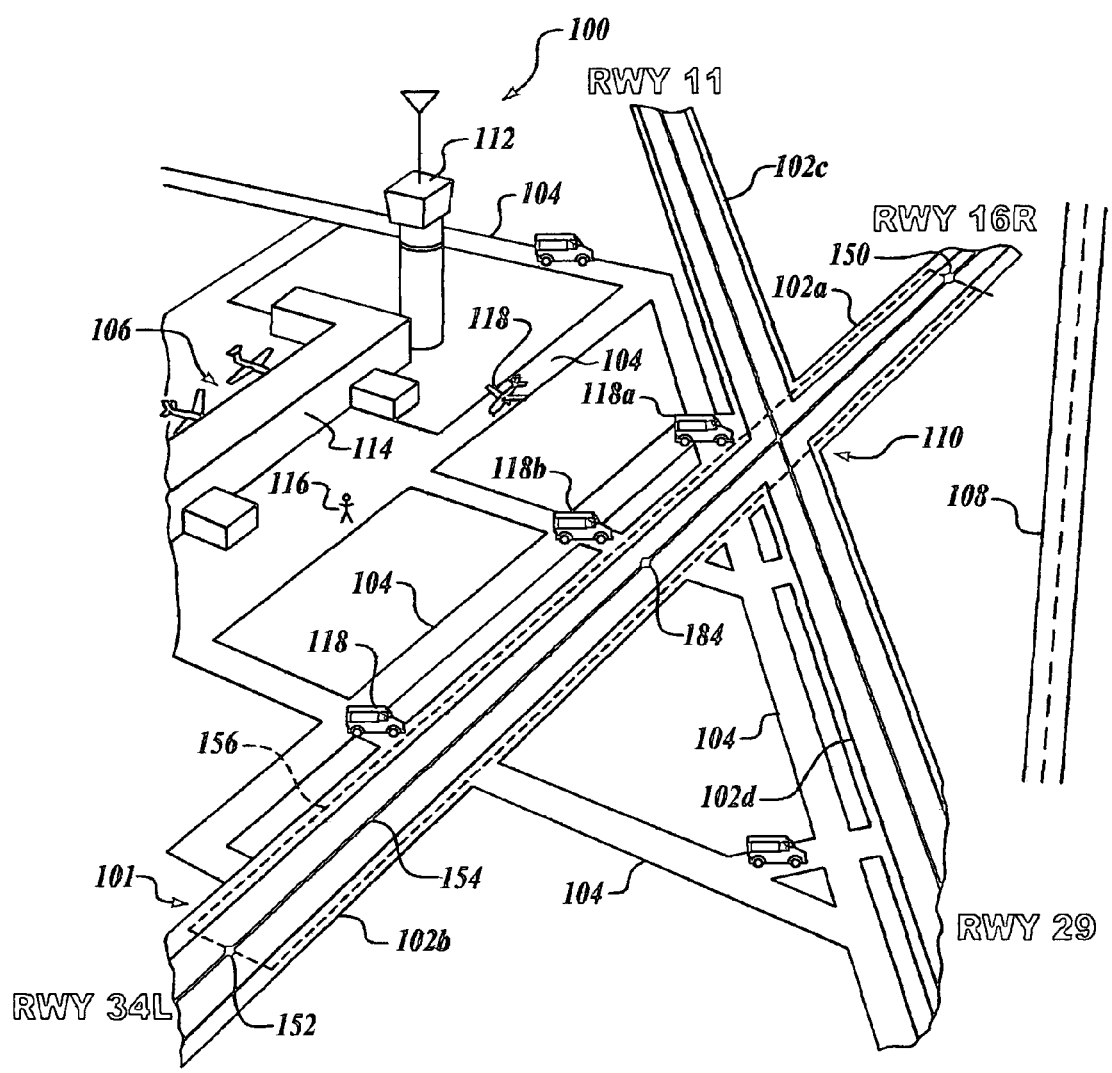
FIG. 1 is an isometric view of an exemplary airport that illustrates a zone of awareness depicted as an envelope surrounding a runway as an exemplary embodiment of the GRAAS of the present invention.

In overview, the invention described by Corcoran provides a system to alert the operator or occupant of a vehicle that the vehicle is approaching or is within a zone of awareness constructed relative to a physical feature. In an airport environment such as depicted in FIG. 1, the feature is an airport control tower, terminal, taxiway, or runway, or other feature of interest. In an exemplary embodiment, the Corcoran invention provides an alerting system that alerts the pilot or flight crew of an aircraft that is taxiing on the ground that the aircraft is approaching or is on a runway, and in some embodiments, which particular runway. However, the vehicle may be any other type of vehicle such as a luggage vehicle, a fuel truck, a maintenance vehicle, a moveable stairway, an emergency vehicle, or any other vehicle found at an airport. Accordingly, the Corcoran invention provides a method for reducing unintentional incursions of taxiing aircraft onto runways. The Corcoran invention can be practiced using a global positioning system (GPS) receiver and other hardware that is already on many vehicles. Therefore, little or no additional hardware is required.

Accordingly, the Corcoran invention provides an alerting system for announcing an alert if the installation vehicle approaches a zone of awareness surrounding a runway. The alerting system includes a database of locations of different features stored in a storage device located on the vehicle, a GPS positioning system for determining the vehicle location, a processor for calculating the distance between the vehicle location and the location of the different features, and an alarm for alerting the occupant when the distance is less than a predetermined value. In other words, the processor is configured to calculate the distance between the zone of awareness and the aircraft, and to initiate an alert if the distance is within selected parameters.

When the features of the Corcoran invention are runways, the stored data may be lines or line segments having endpoints defined by the longitude and latitude coordinates of the different runways. The zones of awareness may be rectangular zones sized using a predetermined width value extending on either side of the line segment. Alternatively, the Corcoran invention provides for the zones of awareness to be augmented as a function of the motion of the vehicle, i.e., velocity and direction of travel of the vehicle, by adjusting the predetermined width value, the vehicle location, the runway location, or the distance between the vehicle location and the runway location. In other words, an alert may be initiated sooner if the vehicle is traveling toward the zone of awareness at a higher speed.

When the vehicle is a taxiing aircraft, the Corcoran invention provides an enablement feature that enables the alerting system when the aircraft is on the ground. The alerting system may include a silencing feature that allows the audible indication to be acknowledged and silenced. It may also have a reset feature that re-enables the alerting system after the aircraft exits the zone of awareness.

The alerting system may include a visual indication that displays a designation to identify the specific runway or other feature within the current zone of awareness. The visual indication may also display other information, such as a map of the airport showing the location of various features, including the control tower, the terminal, taxiways, and runways.

Alternatively, the alert may be an aural or audible indication produced as a synthesized voice warning announced via a speaker. In an airport environment, for example, the Corcoran III invention may produce a voice warning such as "Runway, runway, runway," which may be repeated continuously as long as the vehicle is within the zone of awareness. Alternatively, the audible alarm may be made less distracting by announcing the warning only once, only a limited number of times, repeatedly for only a limited time, or only periodically. The synthesized voice warning may indicate where the zone of awareness is relative to the vehicle, for example, "Runway ahead," or "Runway on the right." The synthesized voice warning may also indicate the runway designation, such as "Entering runway two-nine."

The alerting system of Corcoran is also useful for aircraft that are in the air on approach. Accordingly, the alerting system is configured to alert the pilot or flight crew when the aircraft is lined up with a runway and is within a predetermined distance from the runway. The enablement feature of the alerting system is operated as a function of the altitude of the aircraft relative to the runway, i.e., the altitude AGL (above ground level) and the rate of decent.

The alerting system of Corcoran may include notifying air traffic controllers of alerts via radio, such as by telemetry. Alternatively, alerts may be broadcast by voice radio or telemetry to alert pilots and flight crew of other aircraft of potential runway incursions. Thus a pilot landing on a particular runway may be able to avoid a runway collision by flying around again when she is alerted that another aircraft has just mistakenly taxied onto the same runway.

The present invention is an apparatus, method and computer program product for providing supplemental position information and airport situational awareness alerts and advisories to pedestrians and vehicle operators during surface operations. The Ground Runway Awareness and Advisory System (GRAAS) of the invention periodically and repeatedly provides any or all of timely aural, textual, graphic or pictographic advisory messages to pedestrians or vehicle operator in a significant number of different scenarios that have led to past runway and taxiway incursion occurrences. Accordingly, a ground runway awareness and advisory system is provided having a database having stored data describing airport features of interest that may include but are not limited to positions of runways and taxiways, aprons, gate areas, vehicle lanes and perimeter roads and areas where ground vehicles are authorized to drive and designated entrance and exit points to these areas; boundaries of the movement versus non-movement areas on the airfield; prohibited or restricted access areas; locations where vehicles may be parked or serviced; and local runway incursion "hot-spots" which are areas with a known increased risk of runway incursions, taxiway transgressions, or other unsafe conditions. The airport features of interest may also include but are not limited to significant structures on the airport surface such as the control tower, airport terminal, hangers, public parking lots and garages, and other significant structures.

According to one embodiment of the invention, the database includes stored data describing such airport features of interest for more than one airport, and may include stored data describing such airport features of interest for a large number of airports. For example, the database may include stored data describing such airport features of interest for all the airports in a county, state, region or country. The database may selectively exclude data describing such airport features of interest for airports from which personnel are excluded or not authorized to use, such as restricted areas of military airfields. However, other databases may include one or more of such restricted areas for use by pedestrians and vehicles authorized to use the restricted areas, such as authorized military personnel and vehicles.

The ground runway awareness and advisory system also includes a processor structured to retrieve one or more of the stored data from the database and to periodically and repeatedly accept input data from one or more sensors, the processor being further structured to: periodically operate logic for sampling the sensor data and extracting from the sampled sensor data state parameters of interest such as latitude, longitude, ground speed and heading, and validating the state parameters of interest, if any state parameters of interest are not directly extractable from the sampled sensor data, operating one or more algorithms to derive the state parameters of interest that are not directly extractable, as a function of the state parameters of interest such as position and optionally heading, periodically operate logic for accessing the database and retrieving therefrom one or more of the stored data describing airport features of interest, as a function of the state parameters of interest such as ground speed and heading, periodically and repeatedly operate logic for constructing as discussed herein one or more zones of awareness relative to the airport features of interest, including constructing a zone of awareness for each of the airport features of interest retrieved from the database and determined to fall within a zone of interest controlled by the position of the GRAAS apparatus wherein the zone of interest may include the entire airport where the GRAAS apparatus is currently located; periodically operate logic for comparing the state parameters of interest with each of the one or more zones of awareness constructed relative to the data retrieved from the database describing airport features of interest, as a function of comparing the state parameters of interest with the one or more zones of awareness constructed relative to the data retrieved from the database, periodically and repeatedly operate logic for detecting one or more of several different alert conditions as discussed herein, as a function of detecting each of the one or more different conditions, periodically operate logic for generating an alert, and if more than one alert condition is detected, operate logic for prioritizing the multiple alerts generated. For example, the alerts are prioritized as Vehicle/Pedestrian Deviations (VPDs) according to a level of potential realization of a runway incursion or taxiway transgression by interfering with aircraft operations by entering or moving on the runway movement area without authorization from air traffic control. The alert conditions of the invention provide several different conditions, including but not limited to an approaching taxiway condition, an on taxiway condition, an excessive ground speed condition, an approaching runway condition, an on runway condition, a runway distance remaining condition, and an approaching end of runway condition, which are prioritized according to potential for causing a runway incursion, taxiway transgression or other unsafe condition or state (hereinafter referred to as an "alert condition." The alert may be generated even if the potential for an incursion, transgression or other unsafe state does not in fact exist, as for example when a runway being approached is not currently otherwise occupied.

According to the prioritization scheme, the alerts are transmitted to an appropriate speaker for annunciation to the pedestrians or vehicle operator.

Alternatively, if more than one alert condition is detected, the multiple alert conditions are prioritized, and alerts are generated for each of the detected alert conditions, but the generated alerts are output as a function of priority. According to another alternative embodiment, an alert is generated only for the highest priority of the detected alert conditions and only this one alert is output for annunciation by the GRAAS apparatus.

Furthermore, the GRAAS processor periodically and repeatedly operates the logic for sampling the sensor data and extracting therefrom the state parameters of interest, and thereafter periodically and repeatedly providing to pedestrians and vehicle operators during surface operations the supplemental position information described herein.

The GRAAS aural advisories are optionally supplemented by a situational awareness display supplied on the GRAAS apparatus and structured to periodically and repeatedly receive and display input from the GRAAS processor. Accordingly, the GRAAS processor periodically operates logic for generating and displaying one or both of text and graphics to the operator indicating one or both of the alerts and a status of the GRAAS.

According to one embodiment of the GRAAS invention, the GRAAS processor periodically operates logic for retrieving from the database many or all of the stored data describing airport features of interest relative to a current zone of interest relative to or surrounding the current position of the pedestrians or vehicle operator currently associated with, i.e., operating, the GRAAS apparatus, and the GRAAS processor further periodically operates logic for generating and displaying a supplemental situational awareness display showing one or more of the airport features of interest relevant to the current zone of interest. Furthermore, the GRAAS processor periodically operates logic for generating and displaying the current position relative to the current zone of interest of the pedestrians or vehicle operator currently associated with, i.e., operating, the GRAAS apparatus.

FIG. 1 is an isometric view of an exemplary airport 100 that illustrates a zone of awareness depicted as an envelope 101 surrounding a runway, thereby illustrating an exemplary embodiment of the present invention. As illustrated, airports are complex conglomerations of one or more runways 102a, 102b, 102c, 102d and taxiways 104, aprons, gate areas 106, vehicle lanes and perimeter roads 108 and areas where ground vehicles are authorized to drive and designated entrance and exit points to these areas; boundaries of the movement versus non-movement areas on the airfield; prohibited or restricted access areas; locations where vehicles may be parked or serviced, ramps, gates, fuel areas, de-icing areas and other functional areas; and local runway incursion "hot-spots" such as runway intersections 110. The airport features of interest may also include but are not limited to other vehicles, aircraft and pedestrians, and other mobile ground features when information about such mobile features is available. The airport features of interest may also include but are not limited to significant structures on the airport surface such as the control tower or other air traffic control facility 112, airport terminal 114, hangers, public parking lots and garages, and other significant structures.

A ground runway awareness and advisory system (GRAAS) of the present invention may be a hand-held device or a system installed on a vehicle. In either case, the present invention may require additional hardware, or may be constructed, all or in part, using hardware already installed on the hand-held device or vehicle, e.g. for other purposes. In one or more embodiments of the invention, such as illustrated in FIG. 1, the operator is a pedestrian 116 carrying the GRAAS embodied in a hand-held device or a vehicle 118 on the ground and having the GRAAS embodied in an apparatus installed thereon. For example, the vehicle may be a truck (shown) or another type of vehicle such as a luggage vehicle, a fuel vehicle, a maintenance vehicle, a moveable stairway, an emergency vehicle, or any other vehicle found at an airport such as the exemplary airport 100. Accordingly, hereinafter a GRAAS Operator 118 is the pedestrian operating the GRAAS apparatus of the invention or the vehicle having it installed thereon.

Figure 2:
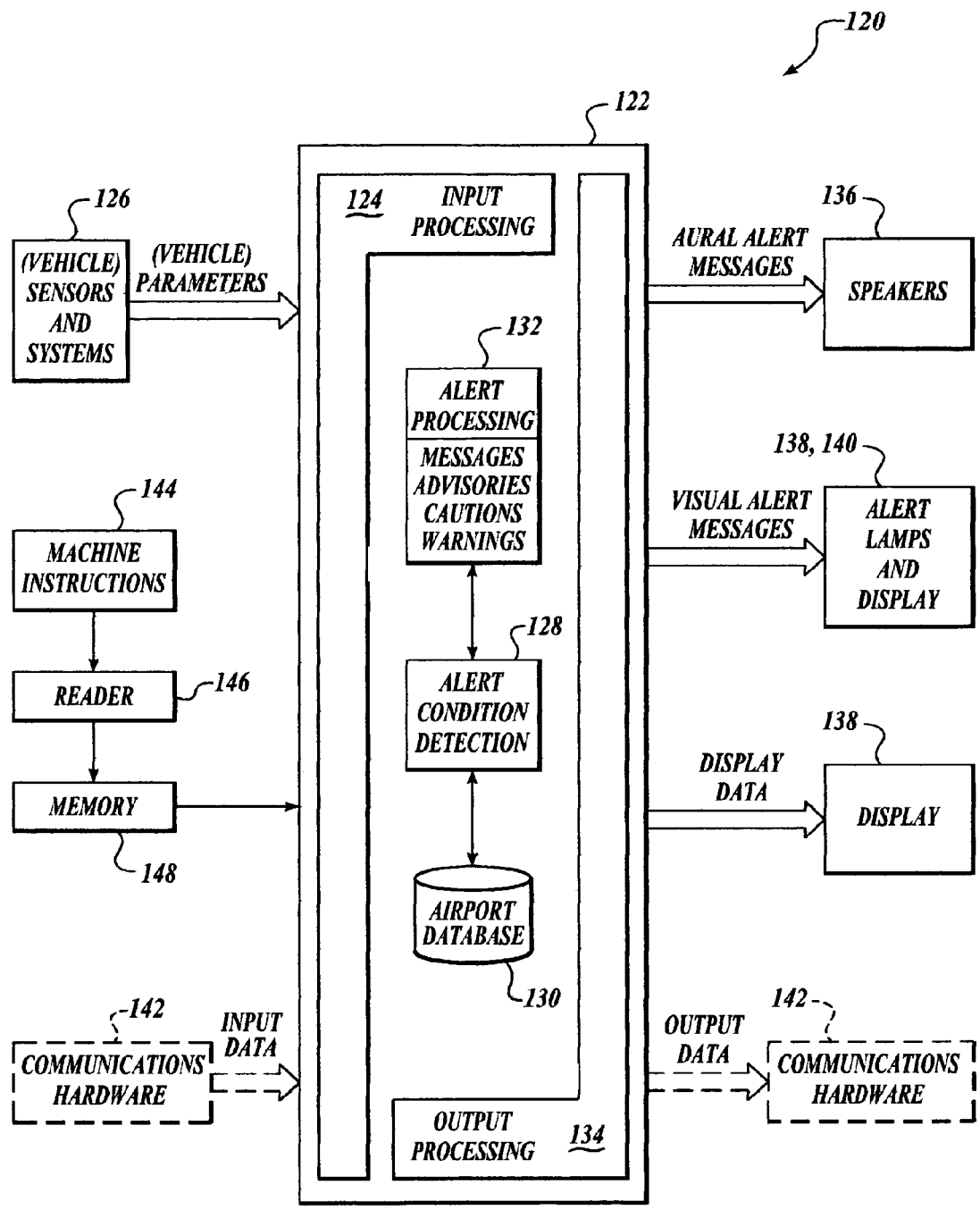
FIG. 2 illustrates the GRAAS of the invention embodied in a functional block diagram of an apparatus for locating a pedestrian or surface vehicle with respect to airport features of interest and providing supplemental position information to the pedestrian or vehicle operator during surface operations.

FIG. 2 illustrates the GRAAS of the invention embodied in a functional block diagram of a method for locating a pedestrian or surface vehicle with respect to airport features of interest and providing supplemental position information to the pedestrian or vehicle operator during surface operations, the method being alternatively embodied in a computer program product operable on a computer processor or embodied in an apparatus 120 configured to operate the computer program product (hereinafter the GRAAS apparatus 120). The apparatus depicted in FIG. 1 additionally optionally transmits the user's position with respect to the airport features of interest, along with a vector combination of heading and ground speed, to communications hardware coupled to an air traffic controller's station in the control tower or other air traffic control facility 112.

The GRAAS apparatus 120 of the invention includes, for example, a processor 122 hosting an input processing functional block 124 that is coupled to periodically sample real-time electronic data signals from one or more sensors and information systems 126, the electronic data signals being representative of one or more state parameters of interest, such as latitude and longitude position information, and may optionally include ground speed, heading and one or more other state parameters as may be of interest. Such data is available in different formats, including analog, discrete, or an advanced digital format. The input processing block 124 is structured to accept data in whatever format the coupled sensor, sensors or information systems 126 provide. For example, the input processing block 124 is coupled to receive real-time electronic signals in digital format from a Global Positioning System (GPS) receiver. Optionally, the input processing block 124 is coupled to receive real-time electronic signals in analog or discrete formats from on-board instrument data sources reporting a vehicle's state parameter information, such as ground speed and heading navigation data.

The navigation data may be obtained directly from the navigation system, which may include an inertial navigation system (INS), a satellite navigation receiver such as a global position system (GPS) receiver, or another source of navigation data such as is known in the art.

The input processing block 124 then periodically and repeatedly extracts and validates the state parameters of interest. Unless latitude and longitude position, ground speed and heading navigation data are directly available and extractable from the sampled sensor data, input processing block 124 uses the validated state parameter information to operate one or more algorithms for computing derived parameter values of interest such as current and/or future position, ground speed, and heading. These and possibly other parameter values of interest are present as internal signals for operation of the GRAAS apparatus 120 of the invention.

The extracted and derived state parameter values of interest as discussed herein are generated as output signals to an alert condition detection logic processing functional block 128 that is coupled to a searchable database 130 of stored data describing airport features of interest to access and retrieve the stored data as a function of the extracted and derived state parameters. The searchable database 130 of stored airport features of interest includes, for example, the information depicted by example and without limitation in FIG. 1, such as the runways 102a–102d and including runway identifiers that identify in an accepted and conventional manner, taxiways 104, aprons, gate areas 106, vehicle lanes and perimeter roads 108 and areas where ground vehicles are authorized to drive and designated entrance and exit points to these areas; boundaries of the movement versus non-movement areas on the airfield; prohibited or restricted access areas; locations where vehicles may be parked or serviced, ramps, gates, fuel areas, de-icing areas and other functional areas; and local runway incursion "hot-spots" 110. The airport features of interest may also include but are not limited to significant fixed obstacles and structures on the airport surface such as the control tower 112, airport terminal 114, hangers, public parking lots and garages, and other significant structures. The searchable database 130 additionally includes stored feature identifiers associated with each airport features of interest for identifying the feature via the GRAAS apparatus 120, as discussed in detail herein. For example, the database 130 includes appropriate specific name identifiers, such as "taxiway," "tower" and "terminal" associated with the airport features of the same name. Alternatively, the database 130 associates an appropriate generic name identifier, such as "structure" with the airport features of the same type. According to another alternative, the database 130 associates an appropriate pictographic identifier with the different airport features. The airport features of interest may additionally be accessible and retrievable as a function of an airport designator for identifying airport, either by name, location or another useful identifying means.

The stored airport feature data includes runway survey data, including runway center point, runway centerline and both runway endpoints, and width and length values. The stored runway survey data may include Runway Position Quality information providing a gross estimate in nautical miles of position uncertainty of runway and Quality Factor information providing fine estimate, for example in feet, of position uncertainty of runway; a runway accuracy factor; runway elevation; runway true heading in degrees for the end of runway, and runway designator angle based on assigned designation; runway designator; and runway quality information and terrain quality data within a selected area surrounding the runway, such as an area of about 15 miles, including highest and lowest elevations; and a survey accuracy factor. The stored airport feature data includes positions of taxiways and positions of significant fixed obstacles and structures on the airport surface, including data describing the structure's footprint.

The searchable database 130 of stored airport features data may be stored in a storage device of a type that is generally well-known. For example, the searchable database 130 may be stored in a computer memory such as random access memory (RAM), read-only memory (ROM), such as a compact disk (CD) ROM, or erasable programmable read-only memory (EPROM). Furthermore, the storage device containing the searchable database 130 may be used for other purposes besides the present invention, or may be dedicated to the present invention.

The alert condition detection logic processing functional block 128 that is coupled to the searchable database 130 to access and retrieve the stored airport features data furthermore operates logic for constructing a one or more zones of awareness relative to each of one or more of the airport features of interest as a function of the extracted and derived state parameters. Several different means for constructing the one or more zones of awareness are contemplated by the invention and are discussed in detail herein.

The alert condition detection logic processing functional block 128 furthermore operates logic for comparing the extracted or derived current position state parameter, i.e., latitude and longitude, with the one or more constructed zones of awareness and determining whether the current position coincides with one or more of the constructed zones of awareness. In other words, whether the present position of the pedestrian or vehicle operator operating the GRAAS device 120 is somewhere inside one or more of the zones of awareness. If the current position coincides with one or more of the zones of awareness, the alert condition detection logic processing functional block 128 then operates logic for detecting one or more of several different conditions discussed herein that result in the different messages, advisories, cautions and warnings of this invention.

The alert condition is optionally provided as a function of determining whether a predicted future position of the vehicle or pedestrian coincides with the position of one or more of the zones of awareness. Accordingly, the alert condition detection logic 128 furthermore operates logic for predicting a future position as a function of state parameters of interest such as latitude, longitude, ground speed and heading; comparing the predicted future position with the position of one or more of the zones of awareness; and determining whether the predicted future position coincides with one or more of the constructed zones of awareness.

As a function of having determined the presence of one or more of the several different conditions, the alert condition detection logic processing functional block 128 generates one or more output signals indicative of each of the detected conditions is generated and output to stimulate an alert processing functional block 132 that receives the signals and responsively operates logic for generating the alerts of this invention as discussed herein, including one or more messages, advisories, cautions and warnings associated with the different conditions that may be detected. Furthermore, the alert processing block 132 operates logic for prioritizing the alerts if alert condition detection logic processing block 128 outputs more than one signal is received indicative of more than one detected condition. The alert processing block 132 generates an alert output signal representative of the one or highest priority of more than one alert generated in response to the detected conditions.

The alert output signal generated by the alert processing block 132 is received by an output processing functional block 134 that operates logic for determining the nature of the alert and appropriate routing of the signal, whether the signal is an aural alert signal, a video alert signal, a discrete visual alert signal, or a communication alert signal, or a combination of one or more of these signals. For example, an aural alert signal is a signal that is structured to stimulate annunciation of the alert over an audio device 136, such as a dedicated speaker portion of the GRAAS apparatus 120, or another general purpose speaker such as a radio speaker, headset or equivalent audio system installed in the cab of a vehicle having the GRAAS apparatus 120 installed thereon. The output processing block 134 routes aural alert signals to such an audio device 136.

The video alert signals are structured to cause a video or other display screen 138 to display either or both of textual and pictographic information representative of status and alerts generated by the alert processing block 132, whereby situational awareness of the pedestrian or vehicle operator is enhanced. The display screen 138 is a dedicated display screen portion of the GRAAS apparatus 120, or another general purpose display screen such as a GPS receiver display screen, a computer display screen, or an equivalent display screen installed in the cab of a vehicle having the GRAAS apparatus 120 installed thereon.

According to one embodiment of the invention, the GRAAS apparatus 120 also provides a situational awareness display for indicating one or more of the current position, ground speed and heading of the GRAAS apparatus 120 relative to the airport features of interest. By example and without limitation, the video alert signals may cause the output processing block 134 to responsively operate logic for retrieving from the database 130 many or all of the stored data describing airport features of interest relative to a current zone of interest relative to or surrounding the current position of the pedestrian or vehicle currently associated with or operating the GRAAS apparatus 120, i.e., the GRAAS Operator 118. The output processing block 134 may responsively cause the video display screen 138 to graphically display the airport features relative to the current zone of interest. The output processing block 134 furthermore causes the video display screen 138 to include a display of the current position of the GRAAS apparatus 120, i.e., GRAAS Operator 118, relative to the current zone of interest so that the pedestrian or vehicle operator can visually see the relative position. Furthermore, according to one embodiment of the invention, the output processing block 134 causes the video display screen 138 to display either or both of textual and pictographic information representative of the alert generated by the alert processing block 132, whereby situational awareness of the pedestrian or vehicle operator is enhanced.

The discrete visual alert signals are structured to cause illumination of one or more discrete alert lamps 140 provided on the GRAAS apparatus 120. The lamps 140 may be of different colors for conveying different levels of urgency, i.e., potential for causing a runway incursion or taxiway transgression, associated with the different conditions discussed herein. For example, the lamps 140 may be provided in white (information only), green (permitted), yellow (cautionary) and red (danger). Additionally, the GRAAS apparatus 120 may include a screen display 138 of a type capable of displaying either or both of textual and pictographic information. Accordingly, the output processing block 134 causes the video display screen 138 to display, in combination with the discrete alert lamps 140, either or both of textual and pictographic information representative of the alert generated by the alert processing block 132, whereby situational awareness of the pedestrian or vehicle operator is enhanced.

Additionally, by reference to the database 130, the alert condition detection block 128 of the GRAAS apparatus determines the appropriate pictographic or name identifier describing airport features of interest relative to the current zone of awareness and generates a signal representative of the identifier for display on the video display screen 138. For example, when the pedestrian or ground vehicle is determined to be within the zone of awareness for the runway 102a, the alert condition detection block 128 of the GRAAS apparatus 120 determines the identification of the runway, and generates a signal representative of the runway identity. The output processing block 134 receives the runway identification signal and operates logic for determining the nature of the identification signal, i.e., whether the signal is a pictographic or name identifier, and appropriate routing of the signal.

The communication alert signals are structured to cause radio or other communication hardware 142 to broadcast either or both of the current alert generated by the alert processing block 132 and one or more of the state parameters of interest. The radio or other communication hardware 142 is a dedicated communication hardware portion of the GRAAS apparatus 120, or another general purpose communication hardware such as an on-board VHF radio circuit, a cellular telephone circuit, or an equivalent radio frequency circuit installed in the cab of a vehicle having the GRAAS apparatus 120 installed thereon or in the possession of a pedestrian carrying the GRAAS apparatus 120, i.e., available to the GRAAS Operator 118, and coupled to the GRAAS apparatus 120 for communicating therewith. The communication hardware 142 is optionally embodied as one of a telemetry device or an optical transmitter. According to one embodiment of the invention, the communications hardware is embodied as radio communications hardware and either or both of the current alert and one or more of the state parameters are broadcast as a radio frequency signal. According to such an embodiment, complementary radio communications hardware is provided in or coupled to an air traffic controller's station in the control tower or other air traffic facility 112, whereby either or both of the current alert and one or more of position, ground speed and heading information for the GRAAS apparatus 120 are conveyed to an air traffic controller for directing surface traffic. In an exemplary embodiment, a system may interface with a CNS/ATM ground mode displayed on the "bright" display console in the ground controller's station in the tower 112.

According to other embodiments of the invention, either or both of the current alert and the one or more state parameters for the GRAAS apparatus 120 are broadcast by voice radio or telemetry for display by hardware on-board other ground traffic and aircraft traffic in the vicinity of the airport having reception capability to alert pilots and flight crew of operating aircraft, e.g. of runway incursions, taxiway transgressions, or other unsafe states. Thus a pilot landing on a particular runway may be able to avoid a runway collision by flying around again when he/she is alerted that a pedestrian or ground vehicle has just mistakenly entered onto the runway. Accordingly, the airport features of interest available to the GRAAS apparatus 120 may also include but are not limited to other ground vehicles, aircraft and pedestrians, and other mobile ground features when information about such mobile features is available. Such information about mobile ground feature includes state parameters of interest, i.e., position, heading and ground speed data, and is available as communication signals received by radio or other communication hardware 142 directly from other GRAAS Operators 118 or re-broadcast by the control tower or other air traffic facility 112.

According to one embodiment of the invention, the GRAAS apparatus shares a general purpose processor with one or more other applications. In other words, the processor 122 is a shared resource. Alternatively, the GRAAS apparatus 120 is embodied in combination with a hand-held or GPS receiver or a GPS system installed on a vehicle wherein the GRAAS apparatus 120 shares the processor 122 with the GPS device. Accordingly, the GRAAS apparatus 120 is embodied as a method in a computer program product described herein and embodied in a plurality of computer-executable machine instructions that are retrieved and executed by the processor 122 for enabling the ground runway awareness and advisory system of the invention for providing supplemental position information to pedestrians and vehicle operators during airport surface operations.

When embodied as illustrated in block diagram of FIG. 2, the GRAAS computer program product of the invention includes a computer-readable storage medium 144 readable by a medium reader 146, the computer-readable program code means being embodied in the plurality of machine instructions stored by the storage medium 144. The medium reader 146 is coupled to the to the processor 122 via a memory device 148. Optionally, the computer-readable storage medium may be part of a memory device 148 for reading by the processor 122. The processor 122 of the present invention implements the computer-readable program code means for receiving sources of instrument signals reporting parameter state information and airport database information, and in response generating a plurality of supplemental position information and airport situational awareness alerts and advisories, as described herein.

In addition to detecting alert conditions, generating the alerts of this invention, determining the nature of the alert and appropriately routing the alert signal, the GRAAS apparatus 120 of the invention and the computer program product embodying the GRAAS method of the invention include means for suppressing the alerts under conditions described herein. For example, the logic operated by the alert processing functional block 132 for receiving the signals and responsively for generating the alerts of this invention additionally generally suppresses the alert generation after the alert has been annunciated one time for each occurrence of the situation giving rise to the alert. Under other circumstances discussed herein the alert suppression may be overcome and the alert repeated one or more times after the initial annunciation.

The GRAAS apparatus 120 and method may also include a manual, audio or other operator actuated switch for suppressing the alert annunciations, whereby potential nuisances are eliminated. Such operator suppression may require prior acknowledgement of the alert. Alternatively, the operator may be permitted to suppress the alert if prior permission is obtained to enter the zone of awareness.

One or more embodiments of the GRAAS invention include logic for determining whether the alert has been suppressed. Thus, alert generation by the alert processing functional block 132 is operated only if the alert has not been suppressed. Alternatively, alert signal routing by the output processing functional block 134 is operated only if the alert has not been suppressed. Such embodiments permitting alert suppression include logic for determining whether the alert has been suppressed. These embodiments include logic for resetting or re-enabling the suppressed alert when or after the GRAAS apparatus 120 exits the current zone of awareness. Thus, GRAAS apparatus 120 is operational if the pedestrian operating the GRAAS apparatus 120 or the vehicle having it installed thereon, i.e., the GRAAS Operator 118, subsequently enters another zone of awareness.

Zones of Awareness

Several different means for constructing the one or more zones of awareness are contemplated by the invention and are discussed in detail herein. A zone of awareness as used herein is generally an area or geographic region constructed relative to a particular airport feature of interest. However, in relation to the description of the various embodiments of the present invention provided in detail below, it must be understood that aspects of the present invention can be used with any system that uses stored information concerning airport features for constructing zones of awareness. As this disclosure is for illustrative purposes only, the scope of the present invention should not be limited to the systems described below, as the concepts and designs described below may be implemented in any type of system that uses airport feature information for constructing zones of awareness.

A zone of awareness is constructed relative to each airport feature of interest designated in the searchable database 130 of stored data describing airport features of interest. According to one embodiment of the invention, a zone of awareness is constructed as an envelope having substantially identical size dimensions, i.e., length and width values, and location, i.e., latitude and longitude values, as the airport feature of interest, as described in related allowed patent application Ser. No. 09/800,175 "INCURSION ALERTING SYSTEM," which is incorporated herein by reference. For example, the zone of awareness constructed relative to the runway 102*a* is an envelope sized, shaped and located substantially identically to the runway 102*a*. According to such embodiments, the alert condition detection logic is operated by processing block 128 for comparing the extracted or derived current GRAAS position state parameter, i.e., latitude and longitude, with a zone of awareness mapped onto the airport feature, such as the runway 102*a*.

Alternatively, a zone of awareness may encompass only part of an airport feature of interest. For example, a zone of awareness may be limited to a part of a taxiway where it abut the runway. In such an embodiment, the zone of awareness may be considerably smaller than the entire taxiway. The zone of awareness may be rectangular as shown for the envelope 101, or may be half circles, i.e., all of the area within a fixed distance of either the end points of the runway or the line segment in between. Zones of awareness may have other shapes, particularly in embodiments where the feature within is an area, such as a hazardous area, other than a runway. Other shape zones of awareness may have other shaped references such as points, polygons, curves, and the like. In many embodiments, zones of awareness are particular geographic areas on the surface of the earth. However, zones of awareness in accordance with the present invention may be defined relative to other references or coordinate systems provided the positioning system is capable of providing information relative to those references or coordinate systems, or that can be converted to such.

According to such embodiments, the alert condition detection logic is operated by processing block 128 for comparing the extracted or derived current or predicted future GRAAS position state parameter, i.e., latitude and longitude, with an augmented zone of awareness extending a fixed distance around the airport feature, such as the runway 102*a*. For example, the processor 122 may be programmed or configured to compute an envelope extending a fixed distance between the GRAAS position and the zone of awareness constructed relative to the airport feature. The alert condition detection processing block 128 thus generates the alert signal if one of the different conditions discussed herein is detected when the GRAAS position is determined to be within the fixed distance envelope around the airport feature of the augmented zone of awareness. An exemplary fixed value is disclosed by the "INCURSION ALERTING SYSTEM" patent application as being between 100 and 200 feet. Additionally, when the airport feature of interest is a runway, the fixed value or distance within which the alert condition detection processing block 128 generates the alert signal is computed by example and without limitation as 150 feet from the runway centerline. Accordingly, a runway 102*a* shown in FIG. 1 is defined in the database 130 by coordinates, such as the end points 150, 152 of line segment 154 defining the endpoints of centerline of the runway 102*a*. Using these endpoints 150, 152, the envelope 101 is constructed relative to the runway 102*a* as a rectangular zone of awareness 156 having a length extending between the two end points 150, 152 and a width extending on either side of the centerline 154 for a fixed distance, such as 150 feet. The zone of awareness 156 for the runway 102*a* is thus 300 feet wide centered on the runway centerline 154 and the same length as the distance between the runway endpoints 150, 152.

In more complex embodiments, the "INCURSION ALERTING SYSTEM" patent application discloses configuring the processor to compensate for the motion of the pedestrian or vehicle operator. Accordingly, the processor 122 of the invention adjusts the zone augmentation parameters as a function of one or both of the state parameters of ground speed and heading. By example and without limitation, the processor 122 increases the fixed distance at which an alert is initiated if the vehicle is approaching the zone of awareness as determined by heading. The amount of increase, for instance, is proportional, or otherwise related to, the ground speed above a threshold ground speed at which the GRAAS is approaching the zone of awareness. Alternatively, the processor 122 is configured to augment the position state parameter, the zone of awareness constructed around the airport feature, or the distance between the position state parameter and the zone of awareness, according to one or both of the state parameters of ground speed and heading of the GRAAS.

Figure 3:
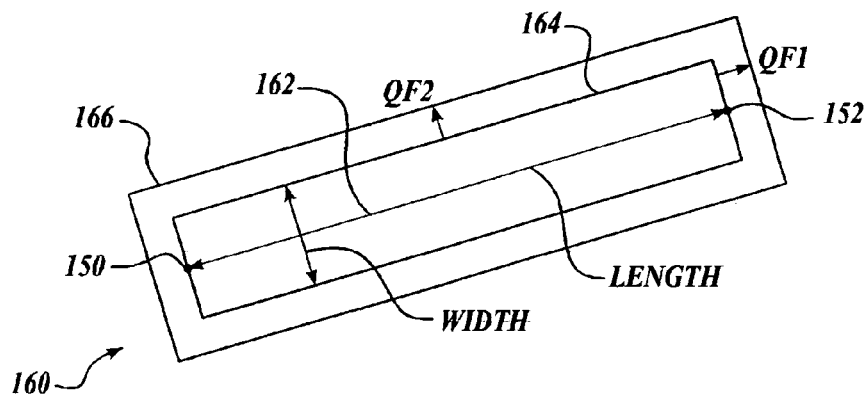
FIG. 3 illustrates an embodiment of a zone of awareness constructed as a "bounding box" according to the GRAAS of the invention.

FIG. 3 illustrates another embodiment of the zone of awareness of the invention. According to the embodiment of FIG. 3, the zone of awareness is constructed according to an algorithm operated by the alert condition detection logic is operated by processing block 128 as an envelope 160 known hereinafter as a "bounding box."

The envelope or bounding box function uses the two opposing endpoints, 150, 152 of a runway or other feature of interest for defining a line segment 162 representing the length along the feature centerline 154, as illustrated in FIG. 1. The runway width relative to this line segment 162, i.e. the centerline 154 of a runway or other feature, is stored as feature information in the database 130 of airport features of interest, as illustrated in FIG. 2. A pair quality factors QF1 and QF2 defining the estimated position uncertainty of the endpoints 150, 152 are also stored as feature information in the database 130. The bounding box function uses these data for constructing two rectangles, as shown in FIG. 3. An inner rectangle 164 is constructed having the width and length of the feature, and an outer rectangle 166 of the bounding box 160 is constructed as an envelope defined by the width and length of the feature enlarged or augmented by the quality factors QF1 and QF2, respectively. The quality factors QF1 and QF2 are optionally constants selected to be substantially identical.

A second optional component of the bounding box algorithm is an advance warning function for comparing the GRAAS position with the zones of awareness relative to each of one or more of the closest airport features of interest, i.e., within a distance of the GRAAS position. The distance is either fixed or variable as a function of the ground speed state parameter. The alert condition detection block 128 furthermore operates a function for computing a "Velocity Lead Term." Rather than trigger on the current GRAAS position, which can introduce undesirable system lags, the Velocity Lead Term is computed using the ground speed and heading state parameter data to predict the position of the GRAAS apparatus 120 a short time into the future. For example, the Velocity Lead Term is computed as the position of the GRAAS apparatus 120 a few seconds, e.g. 2–3 seconds, into the future. The Velocity Lead Term is thus present to provide the GRAAS operator 118 sufficient time to respond to an indication that an alert condition is about to be triggered.

A third optional component of the bounding box algorithm is a "Track Deviation" function that is used to reduce false or nuisance callouts while operating on a taxiway parallel to a runway, such as one of the taxiways 104 illustrated in FIG. 1 as being parallel with the runways 102a, 102b. The Track Deviation function is operated by the alert condition detection block 128 of the processor 122 to select a parallel runway only under two conditions: if the current GRAAS position is within the inner rectangle 164 shown in FIG. 3, i.e. the actual boundary of the runway; and if an angle measured between the GRAAS position track and the runway centerline 154 is greater than a selected angle, commonly referred to as "right angle intersection," whereby the GRAAS position can be projected to enter the runway zone of awareness. According to one embodiment of the invention, the selected right angle intersection is about 15 degrees. When the GRAAS ground speed falls below a threshold speed, such as 5 knots, the second right angle intersection term drops out and is neither computed nor used to control operation of the Track Deviation function.

Figure 3A:
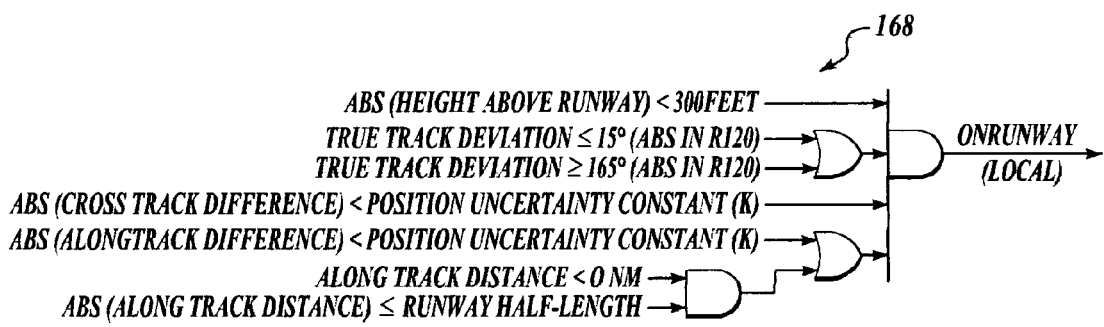
FIG. 3A illustrates a Track Deviation function of an alternative on-ground Runway Selection Logic of the invention embodied in an exemplary logic diagram.

FIG. 3A illustrates the Track Deviation function of the alternative on-ground Runway Selection Logic embodied in an exemplary logic diagram 168. According to the Track Deviation function as illustrated in FIG. 3A, for each entry in the array of two or more closest runways, an "On Runway (local)" term is computed and output.

Accordingly, the "On Runway (local)" is TRUE for all runways that satisfy the following criteria: (1) the absolute value of the aircraft altitude or "Height Above Runway" is less than a selected value that indicates the aircraft is on the ground, such as 300 feet; (2) the aircraft current position is within the inner boundary of the runway 102, shown in FIG. 3, as determined by: (a) the absolute value of a Cross Track Distance relative to the inner boundary of the runway 102 is less than a pre-selected Position Uncertainty Constant (K); (b) if an Along Track Distance relative to the inner boundary of the runway 102 is less than a minimum value, such as 0 nautical miles (where the along-track distance is a signed number that positive on approach to the runway threshold and negative between the two endpoints of runway and having a maximum negative value at the midpoint of the runway so that a minimum value of 0 nautical miles indicates that the aircraft has crossed the threshold onto the runway), and the absolute value of the Along Track Distance is also less than half of the runway length; and (c) the Along Track Distance is less than the pre-selected Position Uncertainty Constant (K); and (3) the angle between the aircraft track and the runway centerline 162 is greater than the right angle intersection, as determined by the True Track Deviation, i.e. the selected right angle intersection, being between limits selected to indicate approximate parallelism with the runway 80 and the runway centerline 162, such as +/−15 degrees. For all entries where "On Runway (local)" is TRUE, this alternative on-ground Runway Selection Logic modifies its output as a function of the number of runway entries marked. Therefore, if no entries are marked, an "OnRwyTaxi" flag is FALSE, else TRUE. If rather exactly one entry is marked, that one entry is selected as the taxi runway (TRwy). However, if multiple entries are marked, the entry having the smallest track deviation in absolute magnitude is selected.

Data published by the Track Deviation function for the Taxi Runway includes: Along Track Distance to Taxi Runway, Cross Track Distance to Taxi, Taxi Runway True Track Deviation Runway, Taxi Airport Designator, Taxi Runway Designator as the angle and character (if any), Taxi Runway Half-Length, Taxi Runway, Taxi Runway Heading, and Taxi Runway Elevation from the Airport Database 130 with the units shown in feet.

According to another embodiment of the GRAAS invention, the alert condition detection block 128 operates another algorithm for constructing the zone of awareness of the invention according to an algorithm based upon an alternate embodiment of runway selection logic described in copending patent application Ser. No. 10/440,461 entitled, "GROUND OPERATIONS AND IMMINENT LANDING RUNWAY SELECTION," which is incorporated herein by reference. For example, according to one embodiment of the zone of awareness constructed for any runway or other airport feature of interest is a surrounding envelope that is augmented as a function of the GRAAS heading and ground speed state parameters. The augmentation function expands the zone of awareness envelope as a function of the current GRAAS vector having a magnitude that includes a fixed amount, an amount proportional to the width of the runway or other airport feature, and an amount proportional to the current GRAAS ground speed in excess of a threshold. The direction of the augmentation expansion is opposite to the current GRAAS heading. The zone of awareness envelope is expanded by the augmentation function parallel to the runway or other airport feature such that the augmented zone of awareness envelope always contains at least the actual runway extents or those of the other airport feature of interest.

Figure 4:
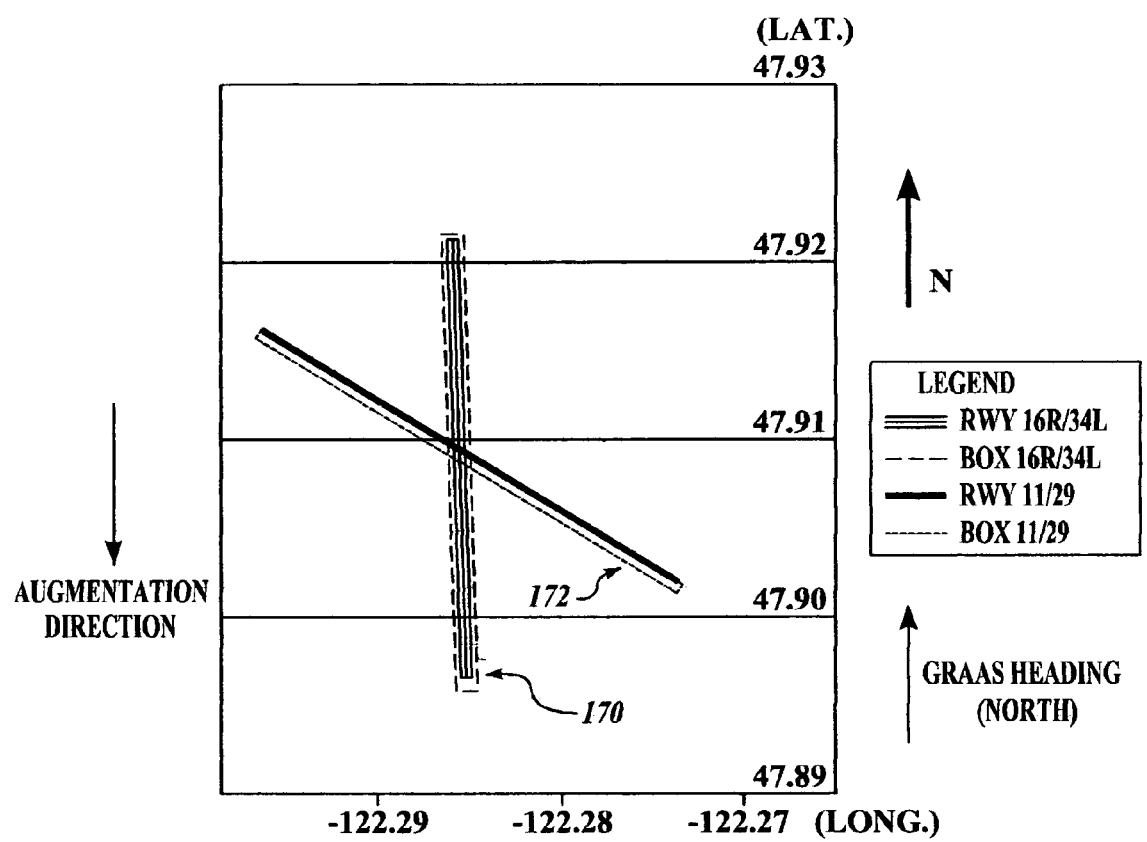
FIG. 4 illustrates exemplary augmented GRAAS runway envelopes according to the invention relative to four runways, RWY 16R/34L and RWY 11/29, for a pedestrian or ground vehicle heading North at 8 knots.
Figure 5:
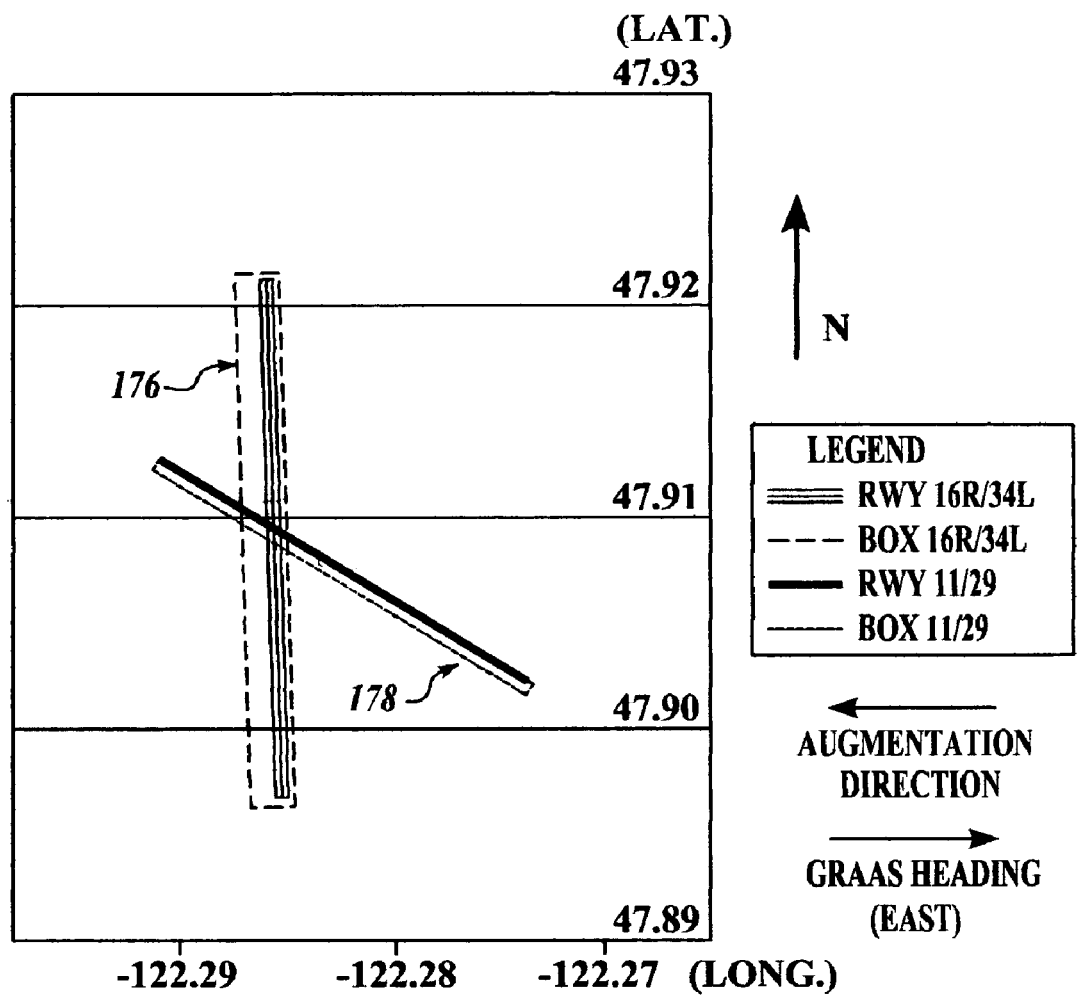
FIG. 5 illustrates exemplary augmented GRAAS runway envelopes according to the invention relative to the four runways shown in FIG. 4 for a pedestrian or ground vehicle on an East heading at 8 knots.
Figure 6:
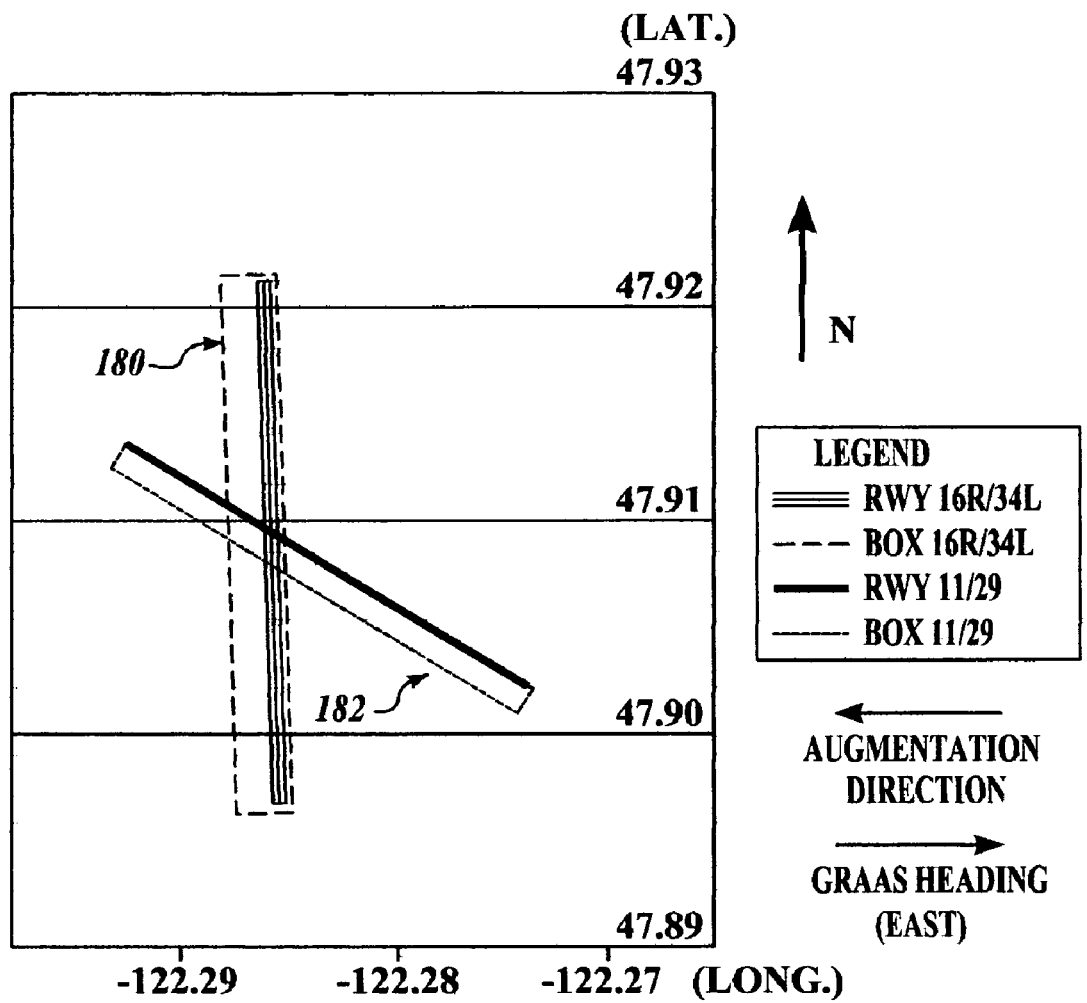
FIG. 6 illustrates exemplary augmented GRAAS runway envelopes according to the invention relative to the four runways shown in FIGS. 4 and 5 for a pedestrian or ground vehicle on an East heading at 36 knots.

FIGS. 4, 5 and 6 illustrate exemplary augmented GRAAS feature of interest envelopes constructed by one alternative algorithm for constructing the zone of awareness of the invention as operated by the alert condition detection block 128 of the invention. While illustrated for runways, according to the invention the alternative zone of awareness construction algorithm is further operated in substantially the same manner to construct a zone of awareness relative to each airport feature of interest. Accordingly, by example and without limitation, the zone of awareness construction function determines a runway envelope that at a minimum includes the runway width and length extents with the runway envelope being further augmented as a function of the GRAAS heading and ground speed state parameters. The augmentation portion of the runway zone of awareness function is accordingly operated to adjust the runway envelope, or other feature of interest envelope, relative to an augmentation expansion having an expansion magnitude that is a combination of a fixed amount, an amount proportional to the width of the runway, or other feature of interest, and an amount proportional to the current GRAAS ground speed in excess of a ground speed threshold. The feature envelope is adjusted by the amount of the augmentation expansion in a direction opposite to the current GRAAS heading direction.

According to one embodiment of the invention, the augmented GRAAS feature envelope is constructed by computing a "Ground Speed Offset" value that is an amount proportional to the GRAAS ground speed state parameter. The Ground Speed Offset is computed according to the formula:

Ground Speed Offset=Period of Prediction*(Ground Speed-Ground Speed Threshold), where: Period of Prediction is given in seconds.

The augmented GRAAS runway envelope is computed according to the formulae:

Augmentation Expansion Length=Width Offset+ Fixed Offset+Ground Speed Offset;

Augmentation Expansion Direction=180−Heading (in degrees);

Box Width Component=Width Function(GRAAS Heading−Runway Heading)*Augmentation Expansion Length; and Box Length Component=Length Function(GRAAS Heading−Runway Heading)*Augmentation Expansion Length, where according to one exemplary embodiment of the invention, nominal input values are given by the following, but may be selected to have different values:

Width Function=sine;
Length Function=cosine;
Width Offset=Width of Runway;
Fixed Offset=25 feet;
Ground Speed Threshold=10 knots; and
Period of Prediction=4 seconds.

Alternatively, according to another exemplary embodiment of the invention, the input values are given by the following:

Width Function=sine function linearized within selected limits; and

Length Function=cosine function linearized within selected limits.

The resulting runway envelope has a shape and a relation to the runway or feature centerline, both of which are dependent upon the GRAAS heading and ground speed in excess of a threshold ground speed, but are not necessarily dependent on the GRAAS location relative to the runway or other feature.

FIG. 4 illustrates exemplary augmented GRAAS feature of interest envelopes or "feature envelopes" relative to two runways, RWY 16R/34L and RWY 11/29, for a GRAAS Operator heading North at 8 knots, where as discussed herein a GRAAS Operator 118 is a pedestrian or ground vehicle operating a hand-held GRAAS apparatus 120, a GRAAS apparatus 120 embodied in a system, or another computer processor operating the GRAAS computer program product. As illustrated, the length and width extents of the runway RWY 16R/34L are represented by a pair of narrow, spaced apart lines with a centerline. The augmentation portion of the zone of awareness construction function provides an augmented portion 170 of the runway RWY 16R/34L that is illustrated as dashed lines bordering the runway on all sides. The Ground Speed Offset value relative to runway RWY 16R/34L is computed as described above using the GRAAS ground speed state parameter of 8 knots. Augmentation Expansion Length is computed as the above combination of Width Offset, Fixed Offset, Ground Speed Offset.

The Augmentation Expansion Direction is substantially aligned relative to the North-South length extents of runway RWY 16R/34L, but is opposite in direction to the North GRAAS heading state parameter.

The Box Width component of the augmented portion 170 is equal to the product of the Width Function of the GRAAS Heading less the Runway Heading times the Augmentation Expansion Length.

The Box Length Component of the augmented portion 170 is equal to the product of the Length Function of the GRAAS Heading (in degrees) less the Runway Heading (in degrees) times the Augmentation Expansion Length.

The resulting runway zone of awareness envelope, represented here by the augmented portion 170, has a shape similar to but larger than the actual runway outline that is aligned to the runway centerline and is offset relative to runway RWY 16R/34L in the Augmentation Expansion Direction.

The length and width extents of the crosswise runway RWY 11/29 are illustrated as a single thick solid line that includes its centerline. The augmentation portion of the runway selection function provides an augmented portion 172 of the runway RWY 11/29 that is illustrated as thin solid lines bordering the runways on the south side and both ends. The Ground Speed Offset value relative to runway RWY 11/29 is computed as described above using the GRAAS ground speed of 8 knots. Augmentation Expansion Length is computed as the above combination of Width Offset, Fixed Offset, Ground Speed Offset; where Width Offset is nominally equal to the actual width of the runway, but maybe selected differently.

The Augmentation Expansion Direction is again South opposite in direction to the North GRAAS heading state parameter and therefore crosswise to north-west by south-east direction of runway RWY 11/29.

The Box Width component of the augmented portion 172 is equal to the product of the Width Function of the GRAAS Heading less the Runway Heading times the Augmentation Expansion Length.

The Box Length Component of the augmented portion 172 is equal to the product of the Length Function of the GRAAS Heading less the Runway Heading times the Augmentation Expansion Length.

The resulting runway zone of awareness envelope, represented here by the augmented portion 172, has a shape that is similar to but larger than the actual runway outline and is offset relative to runway RWY 11/29 in the Augmentation Expansion Direction.

FIG. 5 illustrates exemplary augmented GRAAS runway envelopes relative to the two runway shown in FIG. 4, RWY 16R/34L and RWY 11/29, but for a GRAAS Operator on an East heading at 8 knots. The augmentation portion of the zone of awareness construction function provides an augmented portion 176 of the runway RWY 16R/34L that is illustrated as dashed lines bordering the runway on all sides. The Ground Speed Offset value relative to runway RWY 16R/34L is computed as described above again using the GRAAS speed of 8 knots. Augmentation Expansion Length is again computed as the above combination of Width Offset, Fixed Offset, Ground Speed Offset. The Augmentation Expansion Direction is oriented across the North-South runway RWY 16R/34L opposite in direction to the East GRAAS heading state parameter. The Box Width component of the augmented portion 176 is equal to the product of the Width Function of the GRAAS Heading less the Runway Heading times the Augmentation Expansion Length. The Box Length Component of the augmented portion 176 is equal to the product of the Length Function of the GRAAS Heading less the Runway Heading times the Augmentation Expansion Length. The resulting runway envelope, represented here by the augmented portion 176, has a shape similar to but larger than the actual runway outline that is offset in the Augmentation Expansion Direction relative to the runway centerline but is substantially aligned relative to the North-South length extents of runway RWY 16R/34L.

The augmentation portion of the runway selection function provides an augmented portion 178 of the runway RWY 11/29 that is illustrated as thin solid lines bordering the runway on the eastward side and end. The Ground Speed Offset value relative to runway RWY 11/29 is computed as described above again using the GRAAS ground speed of 8 knots. Augmentation Expansion Length is computed as the above combination of Width Offset, Fixed Offset, Ground Speed Offset. The Augmentation Expansion Direction is opposite in direction to the East GRAAS heading state parameter and therefore crosswise to NW by SE runway RWY 11/29. The Box Width component of the augmented portion 178 is equal to the product of the Width Function of the GRAAS Heading less the Runway Heading times the Augmentation Expansion Length. The Box Length Component of the augmented portion 178 is equal to the product of the Length Function of the GRAAS Heading less the Runway Heading times the Augmentation Expansion Length. The resulting runway envelope, represented here by the augmented portion 178, has a shape that is similar to but larger than the actual runway outline and is offset relative to runway RWY 11/29 in the Augmentation Expansion Direction.

FIG. 6 also illustrates exemplary augmented GRAAS runway envelopes relative to the two runways shown in FIGS. 4 and 5, RWY 16R/34L and RWY 11/29, but for a GRAAS Operator on an East heading at 36 knots. The augmentation portion of the zone of awareness construction function provides an augmented portion 180 of the runways RWY 16R/34L that is again illustrated as dashed lines bordering the runway on all sides. The Ground Speed Offset value relative to runway RWY 16R/34L is computed as described above using the greater GRAAS ground speed of 36 knots. Augmentation Expansion Length is again computed as the above combination of Width Offset, Fixed Offset, Ground Speed Offset. The Augmentation Expansion Length is longer than in the examples of FIGS. 4 and 5 because of the greater GRAAS ground speed. The Augmentation Expansion Direction is again aligned across the North-South runway RWY 16R/34L in opposite direction to the East GRAAS heading state parameter. The Box Width component of the augmented portion 180 is equal to the product of the Width Function of the GRAAS Heading less the Runway Heading times the Augmentation Expansion Length. The Box Width component is larger than in the examples of FIGS. 4 and 5 because of the greater GRAAS ground speed. The Box Length Component of the augmented portion 180 is equal to the product of the Length Function of the GRAAS Heading less the Runway Heading times the Augmentation Expansion Length. The resulting runway zone of awareness envelope, represented here by the augmented portion 180, has a shape similar to but larger than the actual runway outline that is offset in the West Augmentation Expansion Direction relative to the runway centerline, but is aligned relative to the North-South length extents of runway RWY 16R/34L.

The augmentation portion of the zone of awareness construction function provides an augmented portion 182 of the runway RWY 11/29 that is illustrated as thin solid lines bordering the runway on the eastward side and end. The Ground Speed Offset value relative to runways RWY 11/29 is computed as described above using the greater GRAAS ground speed of 36 knots. Augmentation Expansion Length is computed as the above combination of Width Offset, Fixed Offset, Ground Speed Offset. The Augmentation Expansion Direction is opposite in direction to the East GRAAS heading and therefore crosswise to NW by SE direction of runways RWY 11/29. The Box Width component of the augmented portion 182 is equal to the product of the Width Function of the GRAAS Heading less the Runway Heading times the Augmentation Expansion Length. The Box Length Component of the augmented portion 182 is equal to the product of the Length Function of the GRAAS Heading less the Runway Heading times the Augmentation Expansion Length. The resulting runway zone of awareness envelope, represented here by the augmented portion 182, has a shape that is similar to but larger than the actual runway outline and is offset relative to runway RWY 11/29 in the West Augmentation Expansion Direction.

Alert Conditions and Announcements

The alert condition detection logic processing functional block 128 operates logic for detecting one or more of several different conditions, including but not limited to an approaching taxiway condition, an on taxiway condition, an excessive ground speed condition, an approaching runway condition, an on runway condition, a reducing runway distance remaining condition, and an approaching end of runway condition. The alert processing functional block 132 receives the signals representative of the alert conditions and responsively operates logic for generating the messages, advisories, cautions and warnings appropriate to the currently detected condition, or the condition having the highest priority if more than one condition is detected.

Figure 7:
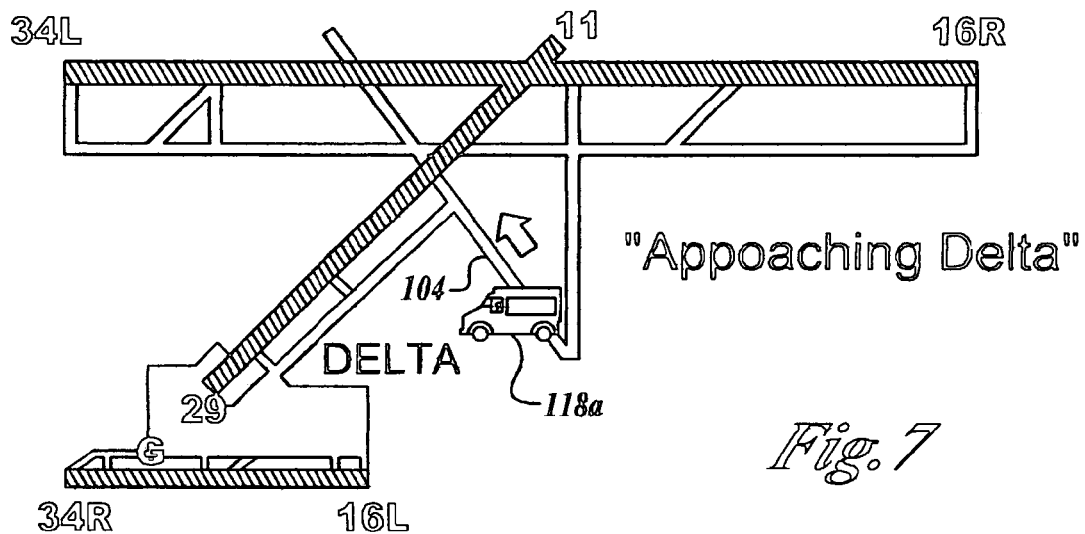
FIG. 7 illustrates an approaching taxiway advisory condition according to the invention wherein a ground vehicle operating a hand-held GRAAS apparatus or having the GRAAS apparatus embodied in a system installed thereon is approaching a taxiway.

FIG. 7 illustrates an approaching taxiway advisory condition wherein a GRAAS Operator 118*a* is approaching a taxiway 104 identified as "delta." According to one embodiment of the invention, approaching a taxiway triggers an approaching taxiway advisory that provides the pedestrian or vehicle operator operating the GRAAS apparatus with awareness of a proximate taxiway edge being approached by the pedestrian or vehicle during surface operations. This advisory is generated as a function of state parameters such as GRAAS ground speed and heading, and position relative to the closest taxiway, i.e., distance from the closest taxiway. When provided as an aural advisory, the advisory annunciates the word "approaching" followed by the taxiway identifier. For example, the advisory annunciates "Approaching delta," for a condition in which the GRAAS apparatus is approaching a taxiway identified by the identifier "delta." This advisory is issued once each time the vehicle approaches the taxiway identified as "delta."

Figure 8:
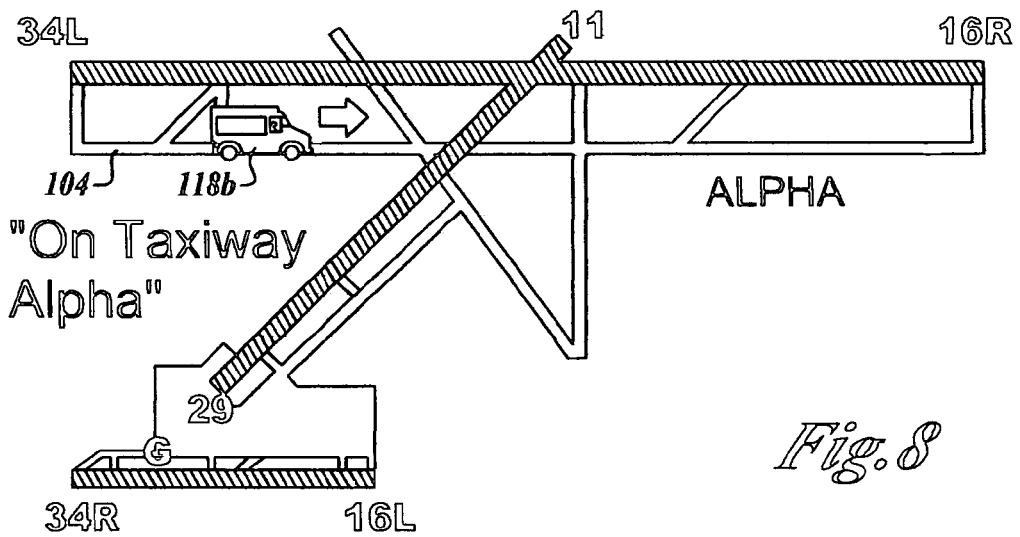
FIG. 8 illustrates an entering or "on" taxiway advisory condition according to the invention wherein a ground vehicle operating a hand-held GRAAS apparatus or having the GRAAS apparatus embodied in a system installed thereon is traveling on a taxiway.

FIG. 8 illustrates an entering or "on" taxiway advisory condition wherein a GRAAS Operator 118b is traveling on a taxiway 104 identified as "alpha." Entering a taxiway triggers an on taxiway advisory that provides the pedestrian or vehicle operator with awareness of which taxiway the vehicle is lined-up with during ground operations. When provided as an aural advisory, the advisory annunciates the words "on taxiway" followed by the taxiway identifier. For example, the advisory annunciates "On taxiway alpha," for a condition in which the GRAAS apparatus is on or lined-up with a taxiway identified by the identifier "alpha." This advisory message is annunciated once each time the vehicle enters the taxiway identified as "alpha."

Figure 9:
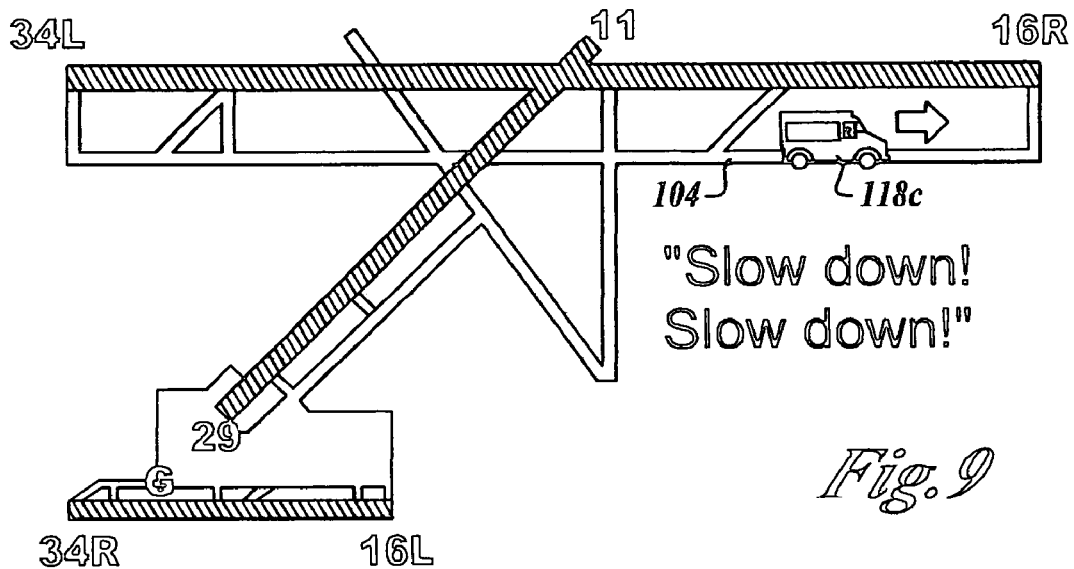
FIG. 9 illustrates an excessive ground speed condition according to the invention wherein a ground vehicle operating a hand-held GRAAS apparatus or having the GRAAS apparatus embodied in a system installed thereon is traveling on a taxiway at a ground speed in excess of a selected maximum threshold ground speed limit.

FIG. 9 illustrates an excessive ground speed condition wherein a GRAAS Operator 118c is traveling on a taxiway 104 at a ground speed in excess of a selected maximum threshold ground speed limit. Traveling in excess of the ground speed limit triggers a velocity monitoring advisory that provides the GRAAS Operator with awareness of traveling in excess of the ground speed limit during ground operations. For example, when provided as an aural advisory, the advisory annunciates the words "Slow down! Slow down!" The velocity monitoring advisory thereby enhances operator awareness of excessive groundspeeds.

Figure 10:
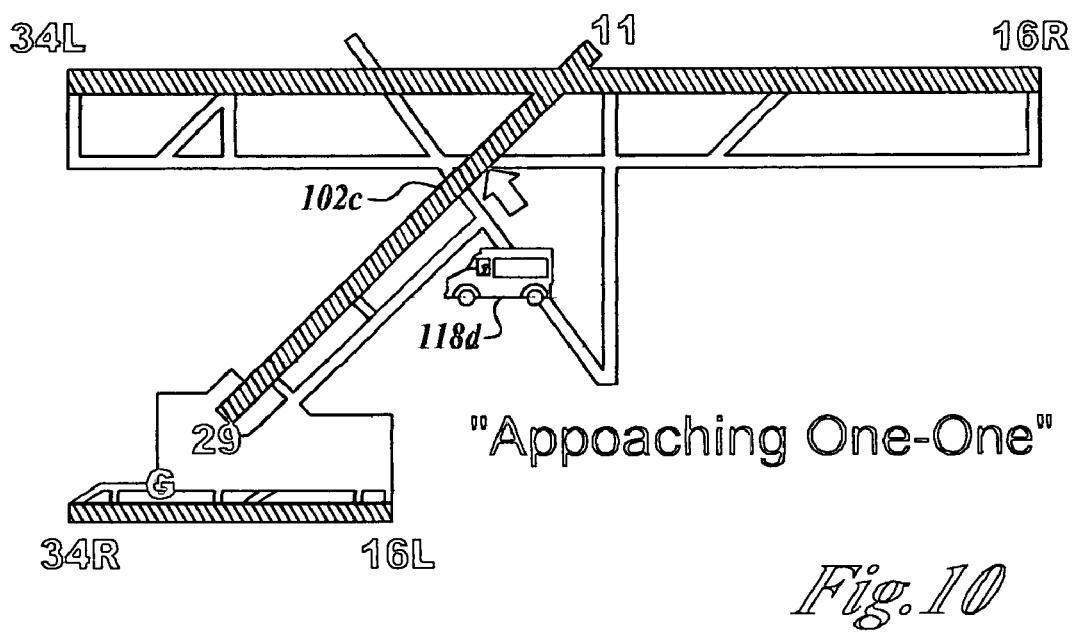
FIG. 10 illustrates an approaching runway advisory condition according to the invention wherein a ground vehicle operating a hand-held GRAAS apparatus or having the GRAAS apparatus embodied in a system installed thereon is approaching a runway.

FIG. 10 illustrates an approaching runway advisory condition wherein a GRAAS Operator 118d is approaching a runway 102c identified as "one-one." According to one embodiment of the invention, approaching any runway triggers an approaching runway advisory that provides the GRAAS Operator 118d with awareness of a proximate runway edge being approached by the pedestrian or vehicle during surface operations. This advisory is generated as a function of state parameters such as GRAAS ground speed and heading, and position relative to the closest runway end, and distance from the closest runway. When provided as an aural advisory, the advisory annunciates the word "approaching" followed by the runway identifier. For example, the advisory annunciates "Approaching one-one," for a condition in which the GRAAS apparatus is approaching a runway identified by the identifier "one-one." This advisory is issued once each time the vehicle approaches the runway identified as "one-one."

The GRAAS algorithms identify the runway approached or entered by GRAAS position relative to the runway location retrieved from the airport database 130. However, under some circumstances, as illustrated by ground vehicle 118a in FIG. 1, the GRAAS heading may instead indicate an approach to an intersection 110 between two runways with a level of uncertainty exists as to which of runway RWY 11/29 and runway RWY 16/34 is being approached. According to one embodiment of the invention, the GRAAS of the invention responds to such a level of uncertainty according to an algorithm substantially the same as described in co-pending patent application Ser. No. 10/440,461 "GROUND OPERATIONS AND IMMINENT LANDING RUNWAY SELECTION," which is incorporated herein by reference. Accordingly, for circumstances in which such a level of uncertainty exists, a generic GRAAS advisory annunciation for the approaching runway is given as, "Approaching runways."

Figure 11:
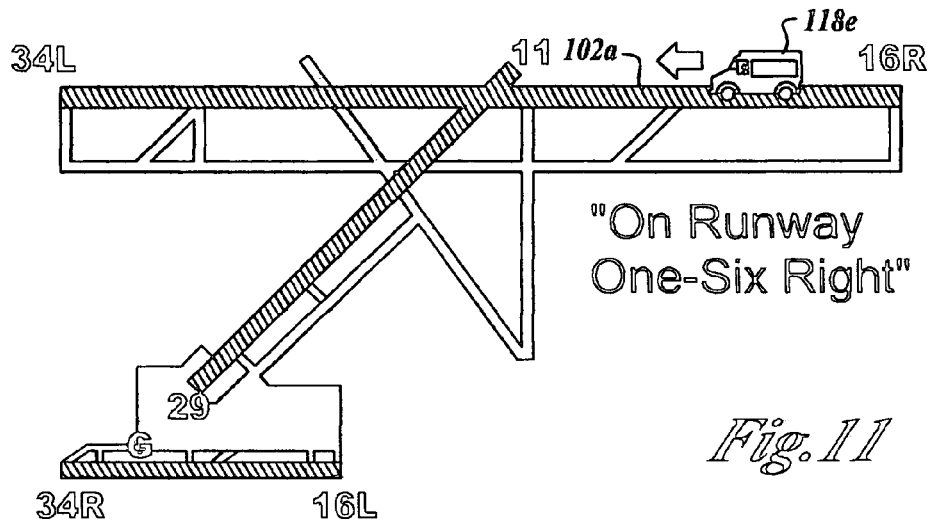
FIG. 11 illustrates an entering or "on" runway advisory condition according to the invention wherein a ground vehicle operating a hand-held GRAAS apparatus or having the GRAAS apparatus embodied in a system installed thereon is traveling on a runway.

FIG. 11 illustrates an entering or "on" runway advisory condition wherein a GRAAS Operator 118e is traveling on a runway 102a identified as "one-six right." Entering a runway triggers an on runway advisory that provides the GRAAS operator with awareness of which runway the operator is lined-up with during ground operations. Runway designation for entry is determined by the GRAAS algorithms as a function of the GRAAS heading state parameter as established relative to the runway direction. If the GRAAS heading becomes aligned with runway RWY 16R within the algorithm's angle parameters, the runway entry advisory announcement is given for runway RWY 16R as, "On one-six right." If instead the GRAAS heading becomes aligned with runway RWY 34L within the algorithm's angle parameters, the runway entry advisory announcement is given for runway RWY 34L as, "On runway three-four left."

The entering or "on" runway advisory or alert is annunciated as the GRAAS heading, i.e., GRAAS Operator 118e, lines-up on the runway within preselected angular limits as determined by the GRAAS algorithms. For example, when provided as an aural advisory, the advisory annunciates the words "on runway" followed by the runway identifier. The qualifying words "left", "right" and "center" are used where appropriate as determined by reference to the airport feature information retrieved from the database 130. For example, the advisory annunciates "On runway one-six right" for a condition in which the GRAAS apparatus is on or lined-up with a runway identified by the identifier "one-six right." This advisory message is annunciated once each time the vehicle enters the runway identified as "one-six right."

According to one embodiment of the invention, if the GRAAS position, i.e., GRAAS Operator 118, remains on the runway for an extended period, GRAAS is optionally configured to annunciate the on runway advisory after a selectable time period.

Figure 12:
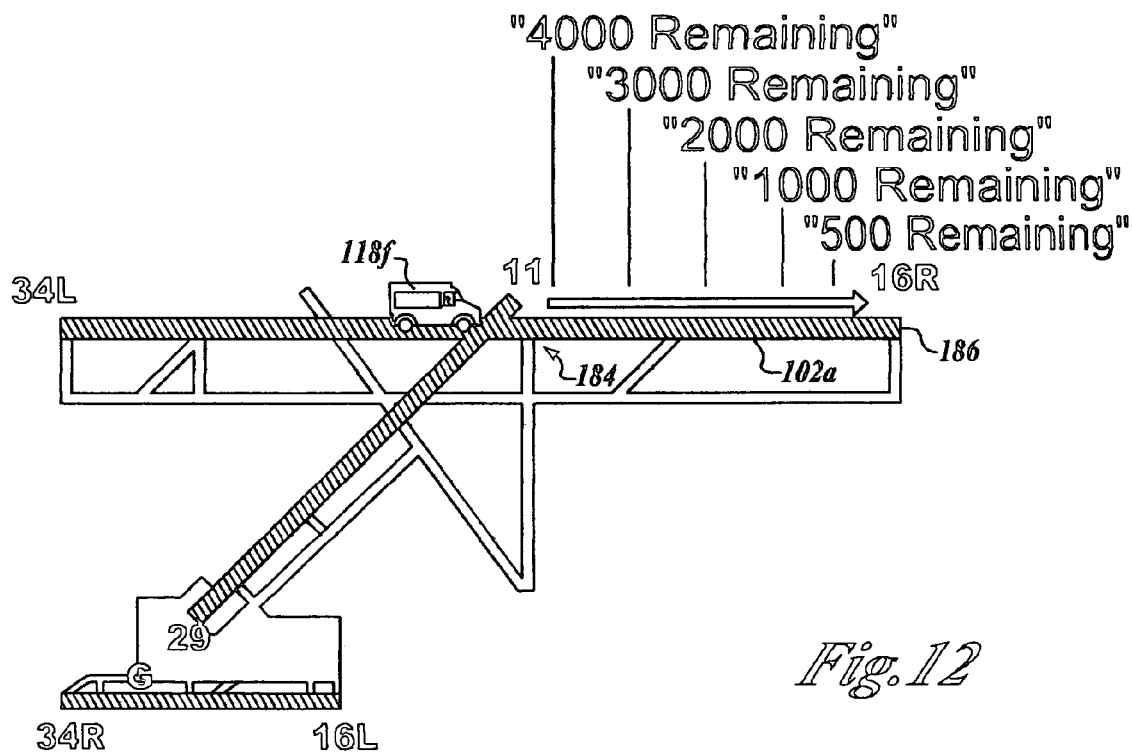
FIG. 12 illustrates a runway distance remaining advisory condition according to the invention wherein a ground vehicle operating a hand-held GRAAS apparatus or having the GRAAS apparatus embodied in a system installed thereon is traveling on a runway.

FIG. 12 illustrates a runway distance remaining advisory condition wherein a GRAAS Operator 118f is traveling on a runway 102a identified as "three-four left." Furthermore, the GRAAS Operator 118f is traveling toward the end of the runway. Traveling toward the end of the runway triggers a runway distance remaining advisory that provides the operator with awareness of the GRAAS, i.e., operator 118f, along-track position information relative to the runway end generally indicated at 186. The distance remaining advisory is generated by the alert condition detection logic block 128 of the invention when the GRAAS, i.e., operator 118f, reaches selected along-track runway positions. For example, the distance remaining advisory is generated for annunciating distance to the runway end in 1000 foot or 300 meter increments, including a final 500 foot or 100 meter announcement generated when the GRAAS, i.e., operator 118f, approaches the runway end 186. According to one embodiment of the invention, the runway distance remaining advisory condition is triggered only after the GRAAS position is determined to be at or past the midpoint or other suitable proportion 184 of the runway according to the direction of travel, i.e., the GRAAS heading relative to the runway heading retrieved from the airport features database 130.

Figure 13:
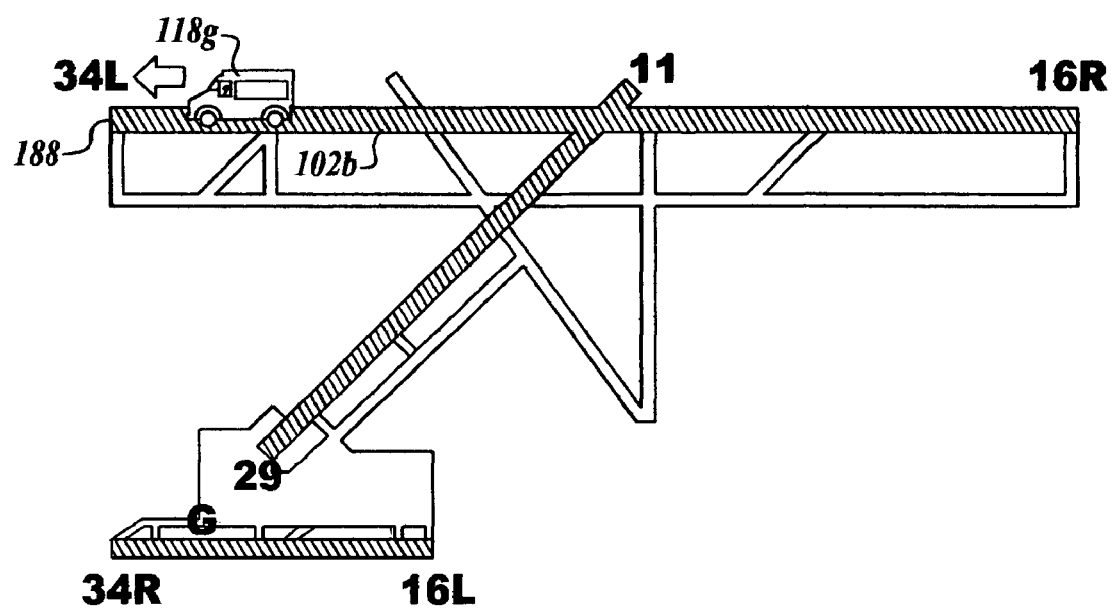
FIG. 13 illustrates a runway end advisory condition according to the invention wherein a ground vehicle operating a hand-held GRAAS apparatus or having the GRAAS apparatus embodied in a system installed thereon is traveling on and nearing an end of a runway.

FIG. 13 illustrates a runway end advisory condition wherein a GRAAS Operator 118g is traveling on a runway 102b identified as " " or "one-six right" and nearing an end 188 of the runway. Nearing the end 188 of the runway 102b triggers a runway end advisory that provides the operator with awareness of the operator's position relative to the runway end. The runway end advisory is generated if the GRAAS position is determined by comparison with the airport features to be on a runway, such as runway 102*b*, and if the GRAAS position is determined to approach within 100 feet or 30 meters of the runway end 188. For example, when provided as an aural advisory, the runway end advisory annunciates the words "One-hundred remaining" in a system having units of feet selected and "Thirty remaining" in a system having units of meters selected.

Computer Program Product

In addition to being practiced as apparatus and methods, the present invention is also practiced as a computer program product for generating and annunciating the supplemental position information and airport situational awareness alerts and advisories of the invention to pedestrians and vehicle operators during surface operations. According to one embodiment of the invention, the ground runway awareness and advisory system, the GRAAS, of the invention is embodied in a computer program product for operation on dedicated or general purpose processor, such as the processor 122 shown in FIG. 2. Accordingly, the computer program product includes a plurality of machine instructions that are retrieved and operated by the processor 122 for enabling the ground runway awareness and advisory system of the invention.

With reference to FIG. 2 and as described herein, the computer program product of the invention includes the computer-readable storage medium 144 that is readable by the medium reader 146, the computer-readable program code means being embodied in the storage medium 144. When transferred to the processor's memory device 148, the machine instructions are executable by the processor 122 for implementing the ground runway awareness and advisory system of the invention.

Figure 14:
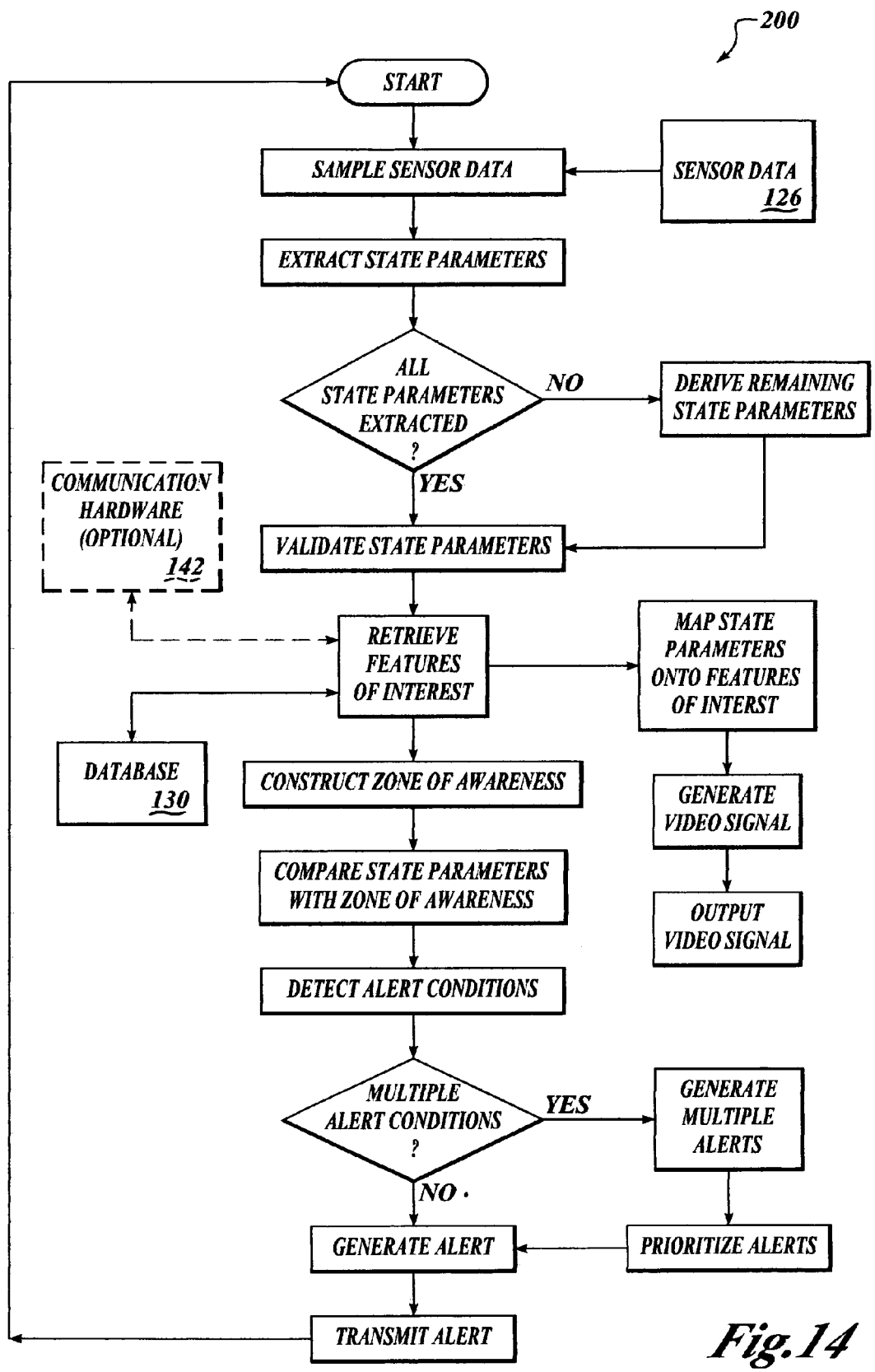
FIG. 14 is a flow diagram that illustrates by example and without limitation the invention embodied as a computer program product for detecting the alert conditions of the invention and for generating and annunciating the airport situational awareness advisories of the invention.

FIG. 14 is a flow diagram 200 that illustrates by example and without limitation the invention embodied as a computer program product for detecting the alert conditions of the invention and for generating and annunciating the airport situational awareness advisories of the invention as described herein. Accordingly, the computer program product includes computer-readable program code means for operating the ground runway awareness and advisory system, the GRAAS, as described herein. Accordingly, the GRAAS of the invention is embodied in a computer program product as a computer usable medium having computer-readable code embodied therein for configuring a computer, the computer program product having: (a) computer-readable code configured to cause a computer to periodically sample the sensor data and extract from the sampled sensor data state parameters of interest such as ground speed, heading and position in latitude, longitude terms; (b) computer-readable code configured to cause a computer to derive state parameters of interest that are not directly extractable from the sampled sensor data; (c) computer-readable code configured to cause a computer to validate the extracted and derived state parameters of interest; (d) computer-readable code configured to cause a computer to, as a function of the validated state parameters of interest, periodically access the searchable database 130 of stored data describing fixed airport features of interest and to retrieve therefrom one or more of the stored data describing airport features of interest; (e) computer-readable code configured to cause a computer to periodically access a source of data describing one or more of the state parameters of interest, i.e., position, heading and ground speed, of other ground vehicles, aircraft and pedestrians, and other mobile airport features of interest when such data is available; (f) computer-readable code configured to cause a computer to, as a function of the validated state parameters of interest, periodically and repeatedly construct as discussed herein a zone of awareness relative to each of one or more retrieved fixed and mobile airport features of interest; (g) computer-readable code configured to cause a computer to periodically compare the state parameters of interest with each of the one or more zones of awareness; (h) computer-readable code configured to cause a computer to, as a function of comparing the state parameters of interest with each of the one or more zones of awareness, periodically and repeatedly detect one or more of several different alert conditions as discussed herein; (i) computer-readable code configured to cause a computer to determine whether more than one alert condition was detected; (j) computer-readable code configured to cause a computer to generate an alert as a function of each of the one or more detected alert conditions; (k) computer-readable code configured to cause a computer to, as a function of determining that more than one alert condition was detected, prioritize among multiple alerts generated as a function of the more than one detected alert condition; and (l) computer-readable code configured to cause a computer to, as a function of prioritizing among multiple generated alerts, output an annunciation representative of an alert having a highest priority, wherein the annunciation is configured as one or more of a discrete signal, a text message signal, a graphics display signal, and a pictographic display signal.

Figure 15:
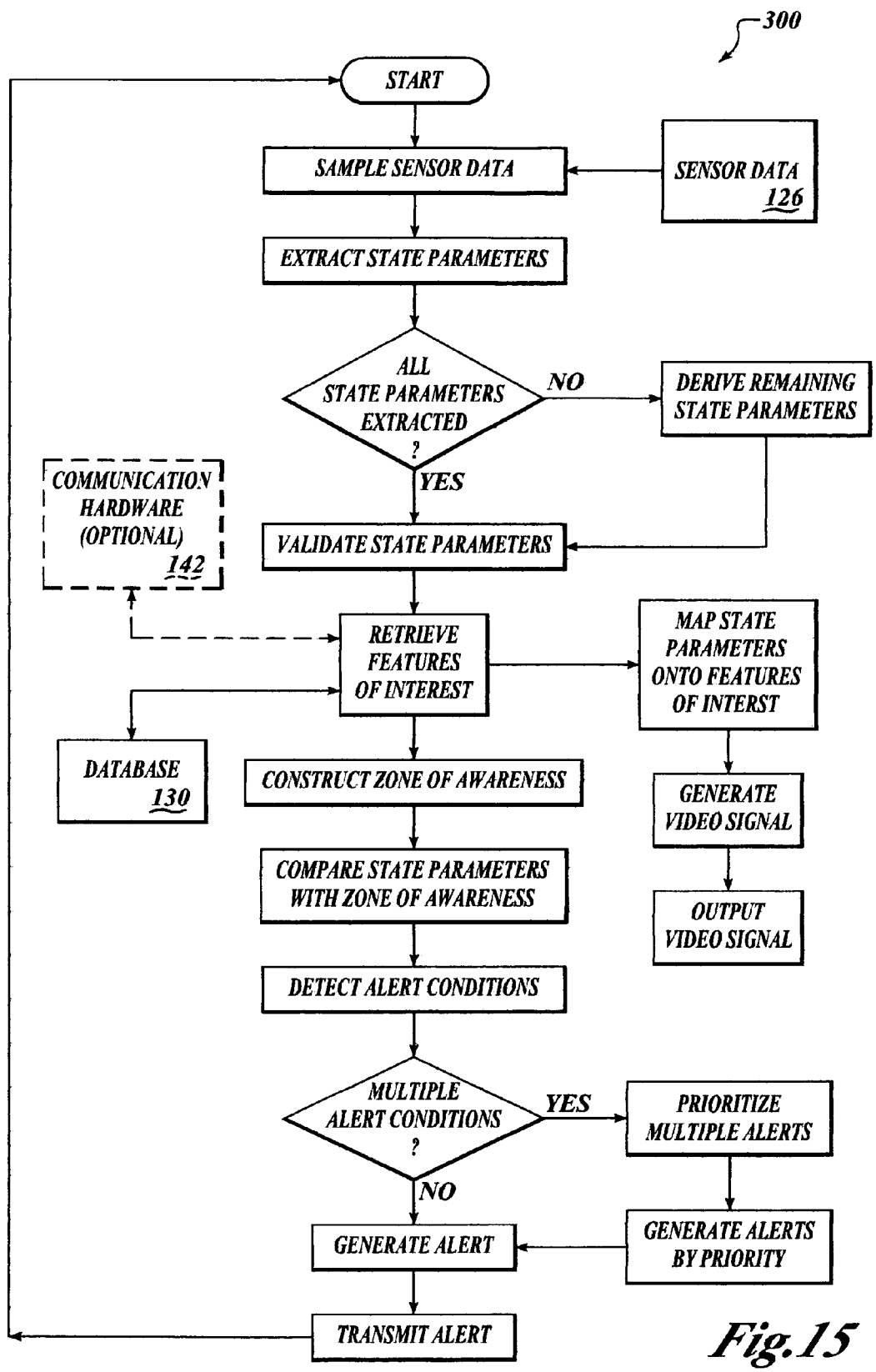
FIG. 15 is a flow diagram that illustrates by example and without limitation an alternative embodiment of the computer program product of the invention.

FIG. 15 is a flow diagram 300 that illustrates by example and without limitation an alternative embodiment of the computer program product of the invention that instead includes computer-readable code configured to, as a function of determining that more than one alert condition was detected, cause a computer to prioritize among the multiple detected alert conditions; and further includes computer-readable code configured to cause a computer to, as a function of prioritizing among multiple detected alert conditions, generate one or more alert as a function of one or more of the detected alert conditions; and computer-readable code configured to cause a computer to, as a function of prioritizing among multiple detected alert conditions, output an annunciation representative of an alert having a highest priority.

Furthermore, as illustrated in both FIGS. 14 and 15, the computer program product of the invention optionally includes computer-readable code configured to cause a computer to periodically and repeatedly map one or more of the GRAAS position, ground speed and heading state parameters onto the retrieved airport features, computer-readable code configured to cause a computer to periodically and repeatedly generate a video or other display signal representative of one or more of the retrieved fixed and mobile (if available) airport features and the GRAAS state parameters mapped thereto, and computer-readable code configured to cause a computer to periodically and repeatedly output the video signal to the video display device 138. The computer-readable code configured to cause a computer to generate a video or other display signal representative of one or more of the retrieved airport features is optionally limited to generate a video or other display signal representative of one or more of the retrieved airport features determined to be within a selected zone of interest fixed relative to the GRAAS position state parameter. Alternatively, the computer-readable code is configured to cause a computer to generate a video or other display signal representative of most or all of the retrieved airport features, and includes computer-readable code configured to cause a computer to zoom in toward and out away from the retrieved airport features. The GRAAS apparatus 120 is thereby configured for periodically and repeatedly providing to pedestrians and vehicle operators, i.e., GRASS Operators 118, during surface operations the supplemental position information described herein.

While the preferred embodiment of the invention has been illustrated and described, it will be appreciated that various changes can be made therein without departing from the spirit and scope of the invention.

What is claimed is:

1. A computer program product comprising:
    a computer usable medium having computer-readable code embodied therein for configuring a computer, the computer program product comprising:
    (a) computer-readable code configured to cause a computer to periodically receive one or more state parameters of interest;
    (b) computer-readable code configured to cause a computer to periodically access a searchable database of stored data describing airport features of interest and to retrieve therefrom one or more of the stored data;
    (c) computer-readable code configured to cause a computer to construct a zone of awareness relative to one or more of the retrieved airport features of interest;
    (d) computer-readable code configured to cause a computer to periodically compare the state parameters with one or more of the zones of awareness;
    (e) computer-readable code configured to cause a computer to periodically detect one or more alert conditions as a function of comparing the state parameters with one or more of the zones of awareness;
    (f) computer-readable code configured to cause a computer to generate an alert as a function of at least one of the detected alert conditions; and
    (g) computer-readable code configured to cause a computer to output an annunciation representative of the alert.

2. The computer program product of claim 1 wherein the computer-readable code configured to cause a computer to periodically access a searchable database of stored data describing airport features of interest and to retrieve therefrom one or more of the stored data further comprises computer-readable code configured to cause a computer to access the searchable database as a function of the state parameters.

3. The computer program product of claim 1 wherein the computer-readable code configured to cause a computer to periodically receive one or more state parameters of interest further comprises computer-readable code configured to cause a computer to periodically sample a source of sensor data.

4. The computer program product of claim 3 wherein the computer-readable code configured to cause a computer to periodically sample the sensor data and to periodically receive one or more state parameters of interest further comprises computer-readable code configured to cause a computer to generate from the sampled sensor data one or more state parameters of interest including one or more of ground speed, heading and position.

5. The computer program product of claim 4 wherein the computer-readable code configured to cause a computer to generate one or more state parameters of interest further comprises one or more of: computer-readable code configured to cause a computer to extract the state parameters of interest from the sampled sensor data, and computer-readable code configured to cause a computer to derive the state parameters of interest from the sampled sensor data.

6. The computer program product of claim 1 wherein the computer-readable code configured to cause a computer to output an annunciation representative of the alert further comprises computer-readable code configured to cause a computer to output the annunciation representative of the alert as a function of a potential of the detected alert conditions for causing one or more of a runway incursion, a taxiway transgression, and an other unsafe state.

7. The computer program product of claim 1, further comprising a processor having the computer program product installed thereon.

8. The computer program product of claim 7, further comprising a searchable database of stored data describing one or more airport features of interest.

9. The computer program product of claim 1, further comprising computer-readable code configured to cause a computer to periodically access a source of data describing one or more state parameters of interest of one or more mobile airport features of interest and to retrieve therefrom one or more of the state parameters of interest of the mobile feature.

10. An electronic processing apparatus configured for providing supplemental position information and airport situational awareness alerts and advisories to pedestrians and vehicle operators during surface operations, the apparatus comprising:
    a searchable database having stored data describing one or more fixed airport features of interest;
    a processor electrically that is coupled to one or more sources of one or more state parameters of interest and is further electrically coupled to access the database and to retrieve therefrom one or more of the fixed airport features of interest data, the processor further comprising:
    (a) means for periodically accessing the searchable database and for retrieving therefrom one or more of the fixed airport features of interest data from the stored data;
    (b) means for constructing a zone of awareness relative to one or more of the retrieved fixed and mobile airport features of interest;
    (c) means for comparing the state parameters with one or more of the zones of awareness;
    (d) means for detecting one or more alert conditions as a function of comparing the state parameters with one or more of the zones of awareness;
    (e) means for generating an alert as a function of a detected alert condition; and
    (f) means for outputting a signal representative of the alert.

11. The apparatus of claim 10, further comprising: a source of communication signal data describing one or more mobile airport features of interest; and
    wherein:
    the processor is further electrically coupled to access the source of communication signal data and to retrieve therefrom one or more of the mobile airport features of interest data which includes one or more of position, ground speed and heading information, the processor further comprising:
    means for periodically accessing the source of communication signal data and for retrieving therefrom one or more of the mobile airport features of interest data; and
    the means for constructing a zone of awareness relative to one or more of the retrieved fixed airport features of interest further comprises means for constructing a zone of awareness relative to one or more of the retrieved mobile airport features of interest.

12. The apparatus of claim 10 wherein the means for periodically accessing the searchable database and for retrieving therefrom one or more of the airport features of interest from the stored data further comprises accessing the searchable database as a function of the state parameters of interest.

13. The apparatus of claim 10 wherein the processor further comprises means for periodically sampling the one or more sources of the one or more state parameters of interest.

14. The apparatus of claim 13 wherein the means for periodically sampling the one or more sources of the one or more state parameters of interest further comprises means for sampling a source of sensor data.

15. The apparatus of claim 14 wherein the processor further comprises means for generating as a function of the sampled sensor data the one or more state parameters of interest, including one or more of ground speed, heading and position.

16. The apparatus of claim 15 wherein the means for generating the one or more state parameters of interest further comprises one or more of: means for extracting the state parameters of interest from the sampled sensor data, and means for deriving the state parameters of interest from the sampled sensor data.

17. The apparatus of claim 10 wherein the means for outputting a signal representative of the alert further comprises means for outputting a signal representative of the alert having a highest priority according to a means for prioritizing as a function of determining a potential of each of one or more detected alert conditions for causing one or more of a runway incursion, a taxiway transgression, or an other unsafe state.

18. An apparatus for providing supplemental position information and airport situational awareness alerts, the apparatus comprising:
a processor coupled for receiving input from a source of own sensor data and further coupled for receiving input from a database of fixed airport features of interest, the processor being configured for executing a plurality of machine instructions, the plurality of machine instructions comprising:
(i) instructions for causing the processor to receive one or more own sensor data from the source of own sensor data;
(ii) instructions for causing the processor to extract one or more own state parameters of interest from the received own sensor data;
(iii) instructions for causing the processor to access the database of fixed airport features to retrieve one or more of the airport features of interest;
(iv) instructions for causing the processor to determine one or more alert conditions as a function of one or more of the own state parameters of interest and one or more of the retrieved fixed airport features of interest, the instructions causing the processor to construct a zone of awareness relative to one or more of the retrieved airport features of interest, and further to compare one or more of the own state parameters of interest with each zone of awareness to determine the one or more alert conditions; and
(v) instructions for causing the processor to output one or more signals representative of one or more of the alert conditions.

19. The apparatus of claim 18, further comprising instructions for causing the processor to prioritize the one or more alert conditions.

20. The apparatus of claim 19 wherein the instructions for causing the processor to prioritize the one or more alert conditions further comprise instructions for causing the processor to prioritize the one or more alert conditions as a function of potential for causing one or more of a runway incursion, a taxiway transgression, or an other unsafe state.

21. The apparatus of claim 18 wherein the instructions for causing the processor to access the database of airport features to retrieve one or more of the airport features of interest further comprise instructions for causing the processor to access the database of airport features to retrieve one or more of the airport features of interest as a function of the own state parameters of interest.

22. The apparatus of claim 18 wherein:
the instructions for causing the processor to access the database of airport features to retrieve one or more of the airport features of interest further comprise instructions for causing the processor to retrieve one or more taxiway and runway features from the database of airport features; and
the instructions for causing the processor to construct a zone of awareness relative to one or more of the retrieved airport features of interest is limited to instructions for causing the processor to construct a zone of awareness relative to one or more of the taxiways and runways.

23. The apparatus of claim 22 wherein the instructions for causing the processor to determine one or more alert conditions as a function of one or more of the own state parameters of interest and one or more of the retrieved airport features of interest further comprise instructions for causing the processor to determine one or more alert conditions as a function of one or more of an approaching taxiway condition, an on taxiway condition, an excessive ground speed condition, an approaching runway condition, an on runway condition, a runway distance remaining condition, and an approaching end of runway condition.

24. The apparatus of claim 18, further comprising a source of one or more mobile airport feature state parameters of interest of one or more mobile airport features of interest, the processor being further coupled for receiving the one or more mobile airport feature state parameters of interest of one or more mobile airport features; and
the plurality of machine instructions further comprising instructions for causing the processor to receive one or more of the mobile airport feature state parameters of interest, and
instructions for causing the processor to determine one or more alert conditions as a function of one or more of the own state parameters of interest and one or more of the received mobile airport feature state parameters of interest.

* * * * *

UNITED STATES PATENT AND TRADEMARK OFFICE
CERTIFICATE OF CORRECTION

PATENT NO.         : 7,117,089 B2
APPLICATION NO.    : 10/789368
DATED              : October 3, 2006
INVENTOR(S)        : Ratan Khatwa et al.

It is certified that error appears in the above-identified patent and that said Letters Patent is hereby corrected as shown below:

Column 28, line 31 claim 10, "a processor electrically that is" should be changed to --a processor that is electrically--.

Signed and Sealed this

Fifth Day of October, 2010

David J. Kappos
*Director of the United States Patent and Trademark Office*